United States Patent
Wee et al.

(10) Patent No.: US 10,114,618 B2
(45) Date of Patent: Oct. 30, 2018

(54) AUTONOMOUS MOBILE SENSOR MOVEMENT PATH SIMULATION WITH AN INTEGRATED DEVELOPER ENVIRONMENT

(71) Applicant: Cisco Technology, Inc., San Jose, CA (US)

(72) Inventors: Susie Wee, Palo Alto, CA (US); Aikepaer Abuduweili, San Jose, CA (US); Wael Kamel, San Jose, CA (US); Ashutosh A. Malegaonkar, Milpitas, CA (US); Yajun Zhang, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 167 days.

(21) Appl. No.: 15/176,946

(22) Filed: Jun. 8, 2016

(65) Prior Publication Data
US 2016/0357525 A1    Dec. 8, 2016

Related U.S. Application Data

(60) Provisional application No. 62/172,480, filed on Jun. 8, 2015.

(51) Int. Cl.
*G06F 9/44*     (2018.01)
*G06F 8/34*     (2018.01)

(52) U.S. Cl.
CPC ....................... *G06F 8/34* (2013.01)

(58) Field of Classification Search
None
See application file for complete search history.

(56) References Cited

U.S. PATENT DOCUMENTS 7,110,859 B2    9/2006   Shibata et al.
8,744,752 B2 *  6/2014   Sung .................... G05D 1/0274
                                                701/300
(Continued)

OTHER PUBLICATIONS

Guillermo et al., "Virtual Sensor for Failure Detection, Identification and Recovery in the Transition Phase of a Morphing Aircraft", Sensors 2010, 10, 2188-2201; doi:10.3390/s100302188.*

(Continued)

*Primary Examiner* — Philip Wang
(74) *Attorney, Agent, or Firm* — Parker Ibrahim & Berg LLP; James M. Behmke; Stephen D. LeBarron

(57) ABSTRACT

According to one or more embodiments of the disclosure, autonomous mobile sensor movement path simulation with an integrated developer environment (IDE) is shown and described. In one embodiment, a computer operates an Internet of Things (IoT) IDE having a virtualized map view illustrating a locational relationship between objects of an IoT application within a represented physical space, where a mobile sensor is virtually represented within the IoT IDE and is configured with navigation control logic affected by external influences and controlled according to the IoT application. Virtualized external influences may be modelled within the IoT IDE that represent physical external influences within the physical space, and the navigation control logic of the mobile sensor may be operated within the IoT IDE according to the IoT application, the virtually represented mobile sensor configured to navigate within the virtual space based on the navigation control logic reacting to the virtual external influences.

18 Claims, 21 Drawing Sheets

(56) References Cited

U.S. PATENT DOCUMENTS

| | | | | |
|---|---|---|---|---|
| 9,069,354 B2* | 6/2015 | Ryu | ............ | G05D 1/02 |
| 2003/0229421 A1* | 12/2003 | Chmura | ............ | A47L 5/36 |
| | | | | 700/245 |
| 2004/0193349 A1* | 9/2004 | Flann | ............ | A01B 69/008 |
| | | | | 701/50 |
| 2005/0075785 A1* | 4/2005 | Gray | ............ | A01B 69/008 |
| | | | | 701/410 |
| 2010/0010695 A1* | 1/2010 | Oomkes | ............ | G01C 17/38 |
| | | | | 701/14 |
| 2015/0304869 A1* | 10/2015 | Johnson | ............ | H04W 24/08 |
| | | | | 701/2 |
| 2016/0236683 A1* | 8/2016 | Eggert | ............ | G01C 21/20 |

OTHER PUBLICATIONS

Ghangrekar, Sharayu Yogesh, "Modeling and Simulating a Path Planning and Obstacle Avoidance Algorithm for an Autonomous Robotic Vehicle", pp. 1-104, 2009, University of North Carolina at Charlotte.

Rashid, et al., "Simulation of Autonomous Navigation Mobile Robot System", Journal of Engineering and Development, vol. 18, No. 4, Jul. 2014, ISSN 1813-7822, pp. 25-38.

Sinopoli, et al., "Vision Based Navigation for an Unmanned Aerial Vehicle", IEEE International Confernce on Robotics and Automation, vol. 2, 2001; pp. 1-2.

Vernier, Michael A., "Virtual Sensor System: Merging the Real World with a Simulation Environment" 2010; pp. 1-94.

\* cited by examiner

AUTONOMOUS MOBILE SENSOR MOVEMENT PATH SIMULATION WITH AN INTEGRATED DEVELOPER ENVIRONMENT

RELATED APPLICATION

The present application claims priority to U.S. Provisional Appl. No. 62/172,480, filed on Jun. 8, 2015 for AUTONOMOUS MOBILE SENSOR MOVEMENT PATH SIMULATION WITH AN INTEGRATED DEVELOPER ENVIRONMENT, by Wee, et al., the contents of which are hereby incorporated by reference.

TECHNICAL FIELD

The present disclosure relates generally to computer networks, and, more particularly, to autonomous mobile sensor movement path simulation with an integrated developer environment (IDE).

BACKGROUND

The "Internet of Things" (IoT), also referred to as the "Internet of Everything" (IoE), represents the next big industrial transformation taking place in computer networking today. While the space is still forming, it is clear that a developer ecosystem and developer experience play an essential role for this transition. That is, IoT and IoE developers are still learning what is an IoT/IoE architecture, and how to efficiently develop an IoT/IoE application and/or technology within a part of the IoT/IoE stack.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
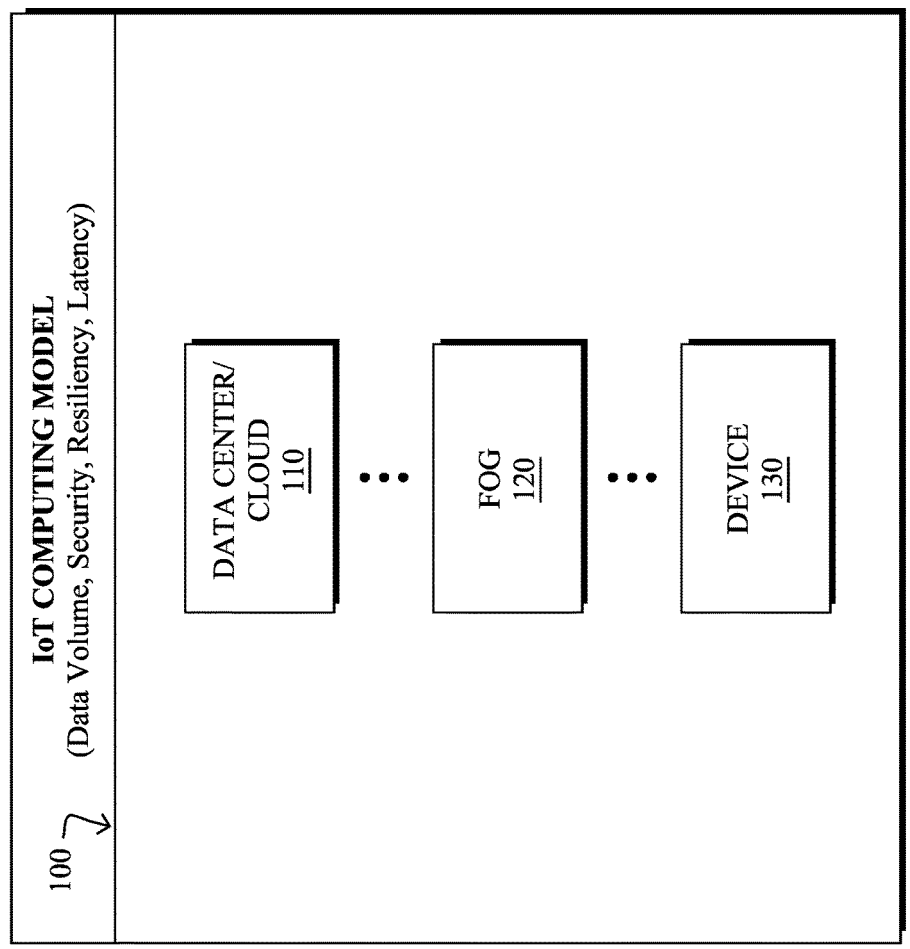
FIG. 1 illustrates an example computing model for IoT.

According to one or more embodiments of the disclosure, autonomous mobile sensor movement path simulation with an integrated developer environment (IDE) is shown and described. In particular, in one embodiment, a computer operates an Internet of Things (IoT) integrated developer environment (IDE) having a virtualized map view illustrating a locational relationship between objects of an IoT application within a represented physical space, where a mobile sensor is virtually represented within the IoT IDE, the mobile sensor configured with navigation control logic affected by external influences and controlled according to the IoT application. Virtualized external influences may be modelled within the IoT IDE that represent physical external influences within the physical space, and the navigation control logic of the mobile sensor may be operated within the IoT IDE according to the IoT application, the virtually represented mobile sensor configured to navigate within the virtual space based on the navigation control logic reacting to the virtual external influences.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links. The Internet is an example of a WAN that connects disparate networks throughout the world, providing global communication between nodes on various networks.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

Loosely, the term "Internet of Things" (IoT) or "Internet of Everything" (IoE) refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

As mentioned above, the IoT/IoE represents an industrial transformation where a developer ecosystem and a developer experience are still being established. In particular, as noted, IoT and IoE developers are still learning what is an IoT/IoE architecture, and how to efficiently develop an IoT/IoE application and/or technology within a part of the IoT/IoE stack.

As an illustration, an IoT/IoE architecture 100 may comprise various layers, such as shown in FIG. 1, which comprise a cloud computing layer 110, a fog computing layer 120, and a device layer 130. Though cloud computing is relatively well-known, fog computing is a paradigm that extends cloud computing to the edge of the network, where similar to the cloud, the fog provides data, computing, storage, and application services to end users, but closer to the devices or "things" (objects, sensors, actuators, etc.). In particular, fog computing supports emerging IoT applications that demand real-time/predictable latency (e.g., industrial automation, transportation, networks of sensors and actuators, etc.), and thanks to its wide geographical distribution is well positioned for real-time big data and real-time analytics.

For today's application developers, there are several pain points and challenges in developing and deploying IoT applications.

A first example challenge is device readiness. IoT/IoE requires a number of physical devices including endpoint and sensing devices and network equipment such as edge routers and wireless equipment. In most cases, developers have to wait for all the devices to arrive before they start programming. This challenge is more severe especially when using expensive and/or unfamiliar technologies.

A second example challenge is in creating sensors, both physical and virtual, in the development environment. The developer may have a number of physical sensors and may want to emulate a larger number of virtual sensors to use in their application.

Figure 2:
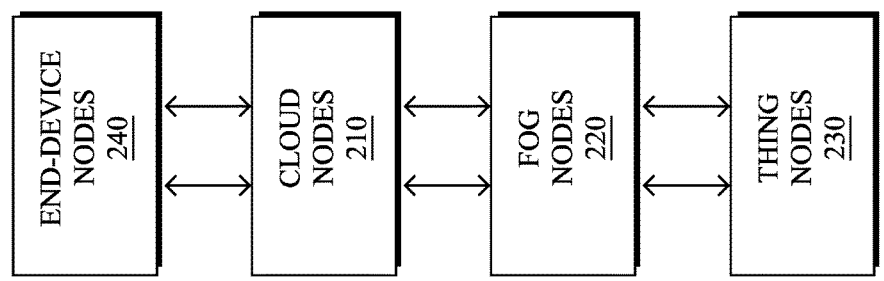
FIG. 2 illustrates an example layered application architecture in one typical IoT application.

A third example challenge is in regard to a layered/distributed IoT architecture, as shown in FIG. 1 above, and also in FIG. 2 (The layered application architecture 200 in one typical IoT application, which involves thing nodes 230, Fog nodes 220, Cloud nodes 210, and end-user nodes 240. Though it provides application developers an opportunity to leverage edge computing, such an architecture also adds more complexity to the whole system, which means that application developers need to put some pieces of logic to certain edge devices and other pieces of logic to somewhere else, and that there isn't one place to gain the overview of all the logics and codes.

A fourth example challenge is design verification before rollout. Because IoT applications (especially industry IoT applications) usually involve a large scale of devices and data, it can be very difficult to perform system testing to verify the design. Application developers may have some devices in the labor but it is extremely difficult if not impossible to mimic the real world situation with just a handful lab devices. For example, you cannot verify your logic for a smart city solution just by using a couple routers and a handful of sensors—the event and data patterns won't match up.

The present disclosure describes an integrated developer environment (IDE) for IoT application developers (also referred to as a "developer accelerator environment"), which improves the IoT developer and operator experience. The illustrative IDE is designed to address the developer challenges of IoT applications with layered/distributed architecture (e.g., cloud, network, fog, devices, etc.), and is aligned with the various aspects of an overall IoT architecture, including things, edge computing, IoT platform as a service (PaaS), and end user devices.

In particular, in the proposed integrated developer environment, various services, tools, etc., are provided for platform emulations, data-flow protocol/algorithm simulation, live management, and so on. With this single environment, developers can easily program even for different thing/fog/cloud platforms, and can also simulate the developed IoT application/service without deploying to real things/Fogs/Clouds/devices. Additionally, the illustrative IDE is not a closed system, and can be configured to leverage and connect to third-party resources, which can include sensor simulation libraries, virtual smart things, cloud services, etc.

Integrated Developer Environment (IDE) for Internet of Things (IoT) Applications An IoT application or "app" typically involves many layers of devices and services, such as the sensors and actuators, the routers, fog-based processing, cloud-based processing, etc. Considering each of these layers when writing an IoT app can be a difficult task, in terms of both interoperability within each layer as well as interoperability across the layers.

Figure 3:
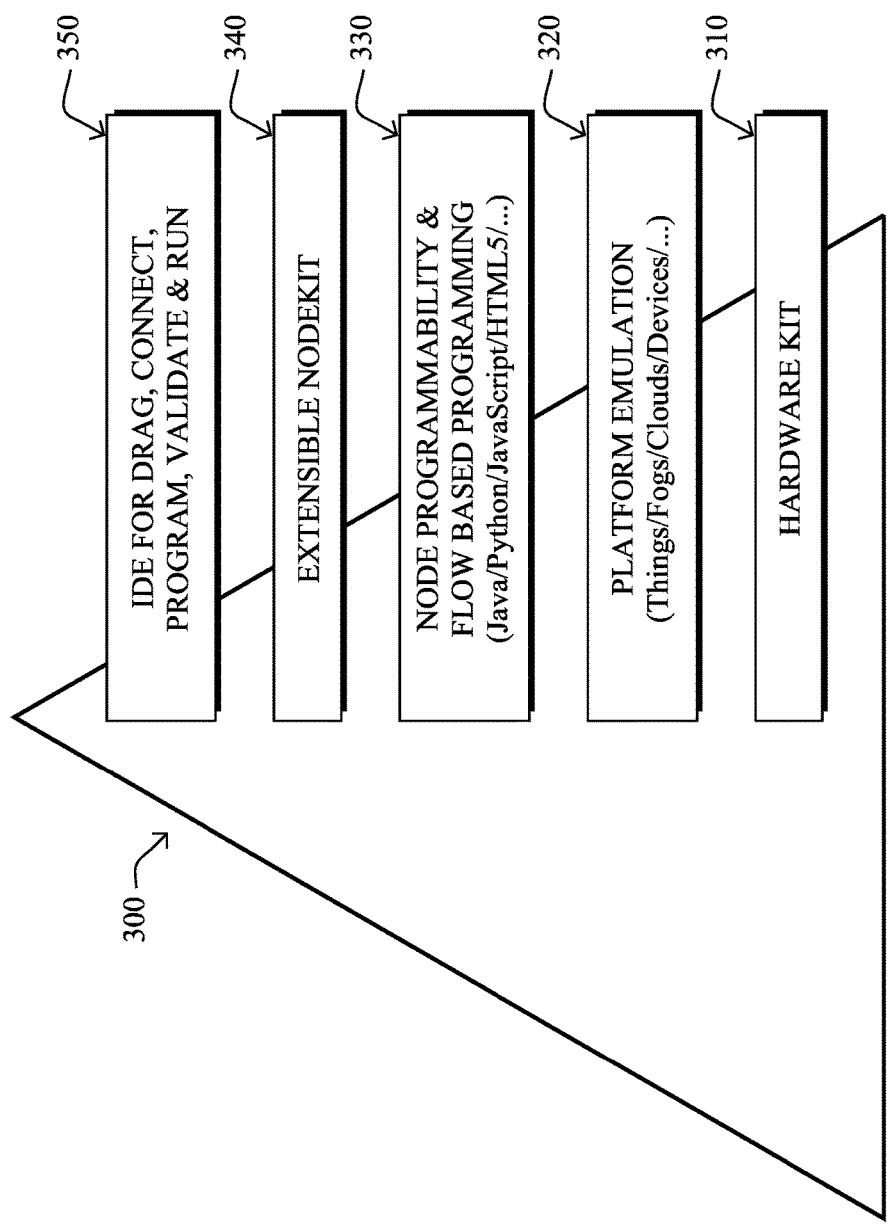
FIG. 3 illustrates an example architecture hierarchy of an IoT IDE.

The embodiments herein, therefore, define a developer accelerator environment, or "integrated developer environment" (IDE), to improve the IoT developer experience. With reference to FIG. 3, various functionalities of the developer environment (architecture hierarchy 300) may comprise a hardware kit 310, platform emulation 320, flow-based programming framework 330 for node programmability, an extensible node-kit 340, and visual developer tools 350 (e.g., drag, connect, program, validate, run, etc.), as described below. In particular, an IDE specific to IoT combines the use of real-world physical devices and virtualized devices (in any degree of the spectrum from all virtual devices to all real-world devices), and allows for virtualization across all layers (from physically sensed data to network functionality to applications). As described below, layers that are not part of the developer's interest may be abstracted (e.g., not caring about the sensed data, or not caring about the network connectivity, etc.) to allow a simplified build of logical interconnectivity for the virtualization. Access to real devices through discovery, a library of known or general devices/services (and their behaviors), and other features make this a robust tool for IoT developers. Also, in one embodiment, algorithms for auto-placement and auto-connection of logical "blocks" are also described. Furthermore, a number of associated user interface gestures are described to allow a user to interact with the IDE of IoT, in particular for touchscreen implementations. Notably, the IDE may be used for "developing" or "programming" an IoT application, and also for "operating" the IoT application, thus providing a "DevOps" tool for IoT applications.

Specifically, according to one or more embodiments herein, a graphical user interface (GUI) is established for an Internet of Things (IoT) integrated developer environment (IDE) with one or more visual developer tools. Nodes are provided within the IoT IDE having connectivity and functionality, where the nodes selected from a) discovered real nodes in communication with the IoT IDE or b) virtual nodes within the IoT IDE, and a plurality are connected as a logical and executable graph for a flow-based programming framework virtualized across one or more IoT layers. The nodes may then be programmed based on respective connectivity and functionality, such that the logical and executable graph has one or more real and/or virtual inputs, one or more real and/or virtual processing functions, and one or more real and/or virtual actions. Upon deploying the node programming to one or more corresponding platform emulators configured to execute the node programming, the logical and executable graph may be simulated by the IoT IDE by executing the node programming to produce the one or more actions based on the one or more inputs and the one or more processing functions.

With regard to the hierarchical levels indicated in FIG. 3, the hardware kit 310 provides a hardware platform which enables developers to start creating simple applications. This may be targeted towards consumer applications, but preferably toward enterprise applications. This hardware kit will not only enable various sensors but will also enable some location service emulation. This platform will be the first step in getting various users or startups programing with the IoT IDE ecosystem.

For platform emulation 320, the platforms to be emulated may include the things (e.g., sensors, actuators, etc.), the Fog platform, the Cloud platform, and the end-user platforms (e.g., Web). Notably, for the things, it is not easy to emulate different things from individual vendors. In one embodiment, therefore, the techniques herein may provide one format specification to standardize about how to specify the functionalities and the interfaces of the virtualized things. Then based on the format specification, thing vendors could provide their virtualized products such that the things could be emulated in the developer environment. For instance, if a particular format "X" is used to describe the virtualized thing, then the developer environment herein can import the "X" file to simulate the thing under the corresponding runtime. Then the thing vendor could use format "X" to design their products and provide customers virtualized samples. Notably, with the emulated platforms, developers can simulate the business logics in individual platforms, and also the data-flow protocol compliance between platforms.

For the node programmability and flow based programming framework 330, the "node" stands for the computing node in different hierarchical levels. It can be one virtualized thing, one Fog node, or one Cloud node. In a lower level, the node could be one MQTT client, one filter, or one data visualization sink. The developer environment herein provides the ability to enable the developers easily to program on these computing nodes using modern programming languages such as Java/Python/JavaScript/etc.

Figure 4:
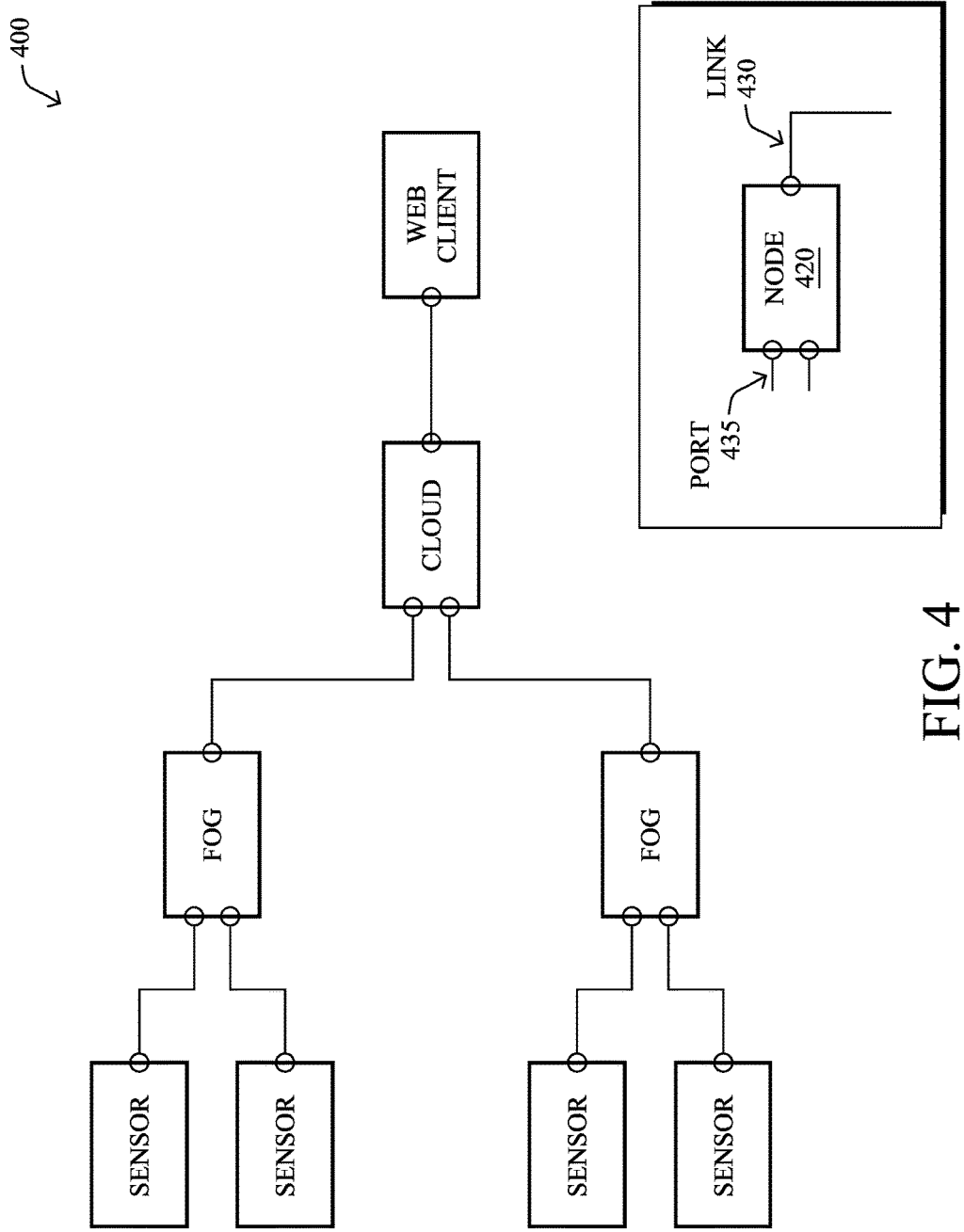
FIG. 4 illustrates an example showcase graph comprising nodes across layers and ports connecting nodes.
Figure 5:
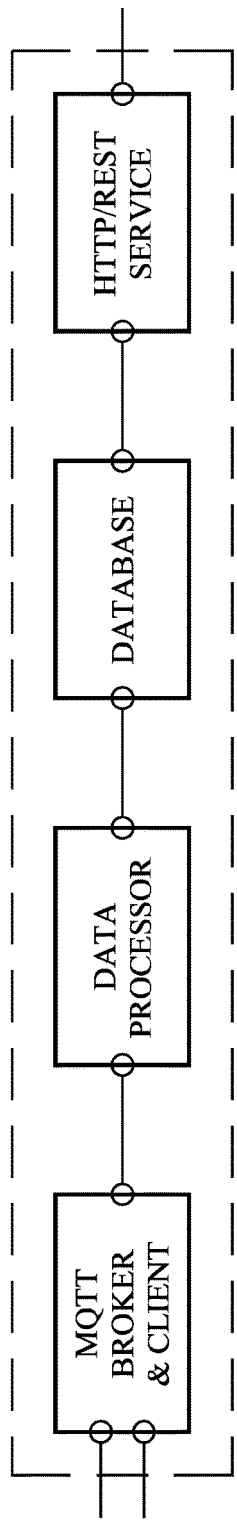
FIG. 5 illustrates an example showcase subgraph in a Fog computing node.

Due to the layered and distributed nature, the IoT application can be viewed as a network of asynchronous processes communicating by means of streams of structured data chunks, not as a single, sequential process. In this view, such as the graph 400 shown in FIG. 4, the focus is on the application data and the transformations applied to it for desired outputs, thus the IoT application architecture fits for the flow-based programming model. In this programming model, each node 420 in the data-processing pipeline may be taken as one separate process and communicates with each other by means of fixed-capacity connections 430. A connection may be attached to the process by means of a port 435, which has a protocol agreed between the processes. The protocols connecting the nodes across layers (things/fogs/clouds layers) can be the networking messaging communication protocols such as MQTT/CoAP/REST/RTP, as illustratively shown in FIG. 4. Also, the protocols connecting the nodes inside one layer can be memory buffers with customized formats, as well as networking protocols, as shown in the subgraph 500 in a fog computing node shown in FIG. 5.

The illustrative IoT IDE provides the flow-based programming framework to allow developers to program the nodes. The flow-based programming framework would include:

a. Node registration service. The framework provides the service that allows developers to register their developed nodes as well as providing the nodes' metadata such as node name, node developer name, node description, the number of node input/output ports and their used protocols.

b. Graph/sub-graph scheduling mechanism, which is to drive the running of the nodes in the graph/sub-graph.

c. Base classes and software developer kits (SDKs) for programming on the nodes, ports and graph. Base classes provide some general interfaces for the nodes, ports and graph; SDKs are provided to allow programmably managing the nodes, ports and graphs, such as dynamically connecting/disconnecting the nodes, starting/stopping the nodes/graphs, or reporting the status of nodes.

Referring still to FIG. 3, the illustrative IDE provides an extensible node-kit 340 to store the implemented nodes which would be commonly used in IoT applications. For example, these nodes can include simulated data source (e.g., MQTT broker, HTTP/REST service), data processing filters and data sinks (e.g., MQTT client, HTTP/REST client). The node-kit support extensibility, and thus the developers can import and register their developed node into the kit.

Lastly, based on the platform emulation, the flow programming framework, and the node-kit, the IoT IDE provides visual developer tools 350 in the IDE for developers to easily program. Examples of such visual developer tools include dragging icons, connecting items logically, programming the items, validating the configurations, and running (executing) the system to obtain a result (virtualization, simulation, etc.).

Figure 6:
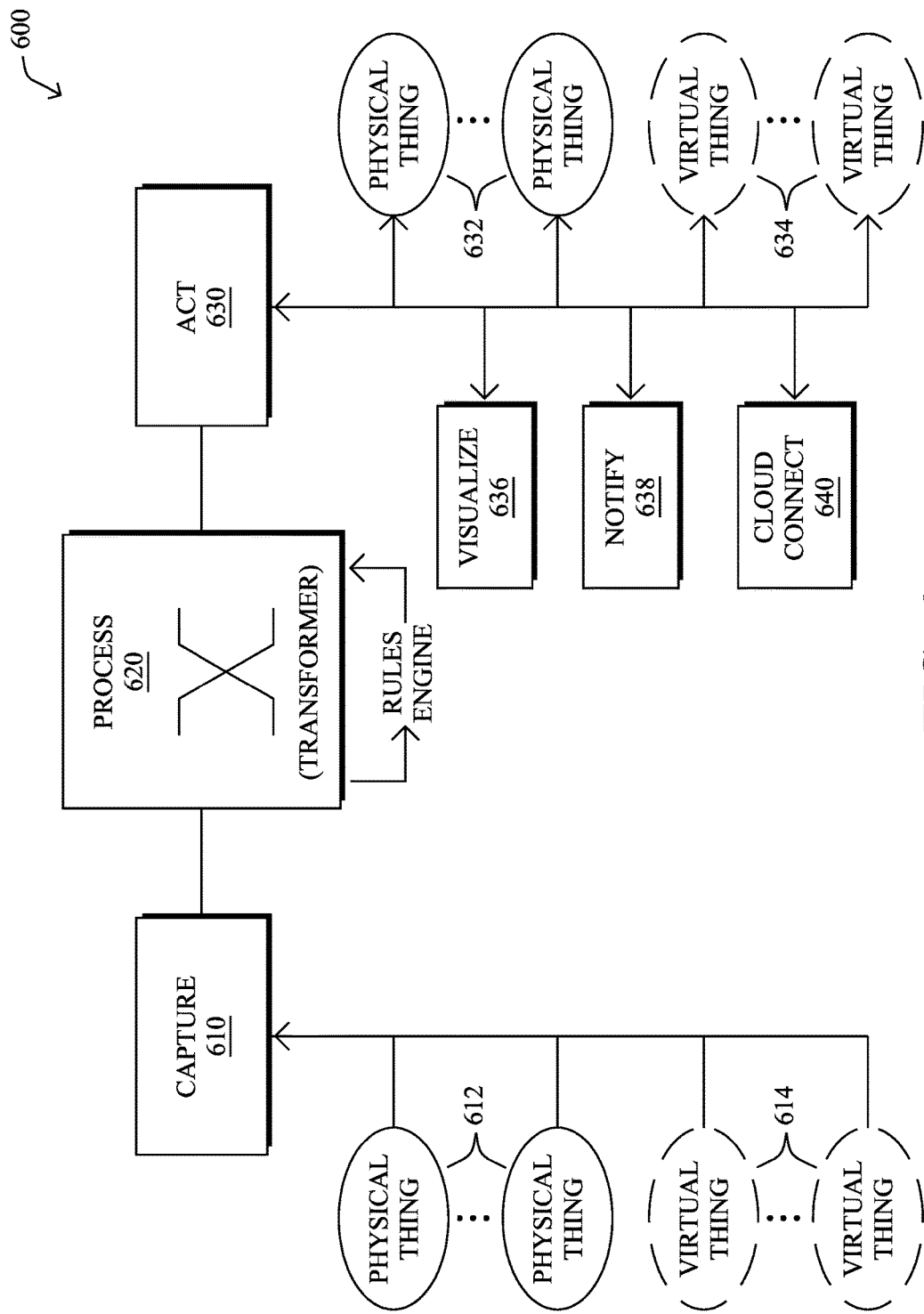
FIG. 6 illustrates an example functional diagram of an IoT IDE.

FIG. 6 illustrates an example functional diagram of the IoT IDE 600 described herein. In particular, the IDE allows developers to capture (610) inputs from any number of physical nodes/things (612) and/or virtual nodes/things (614) (e.g., objects, sensors, data producers, etc.), and processes the inputs (620) (e.g., transformations based on one or more rules engines) to result in one or more corresponding actions (630). Example actions include outputs to physical things (632) and/or virtual things (634) (e.g., objects, actuators, indicators, etc.), as well as various visualizations (636) (e.g., graphs, charts, values, etc.), notifications (638)

(e.g., email, SMS, etc.), or cloud connections (640) (e.g., big data analysis, Internet sharing, database storage, etc.).

Figure 7:
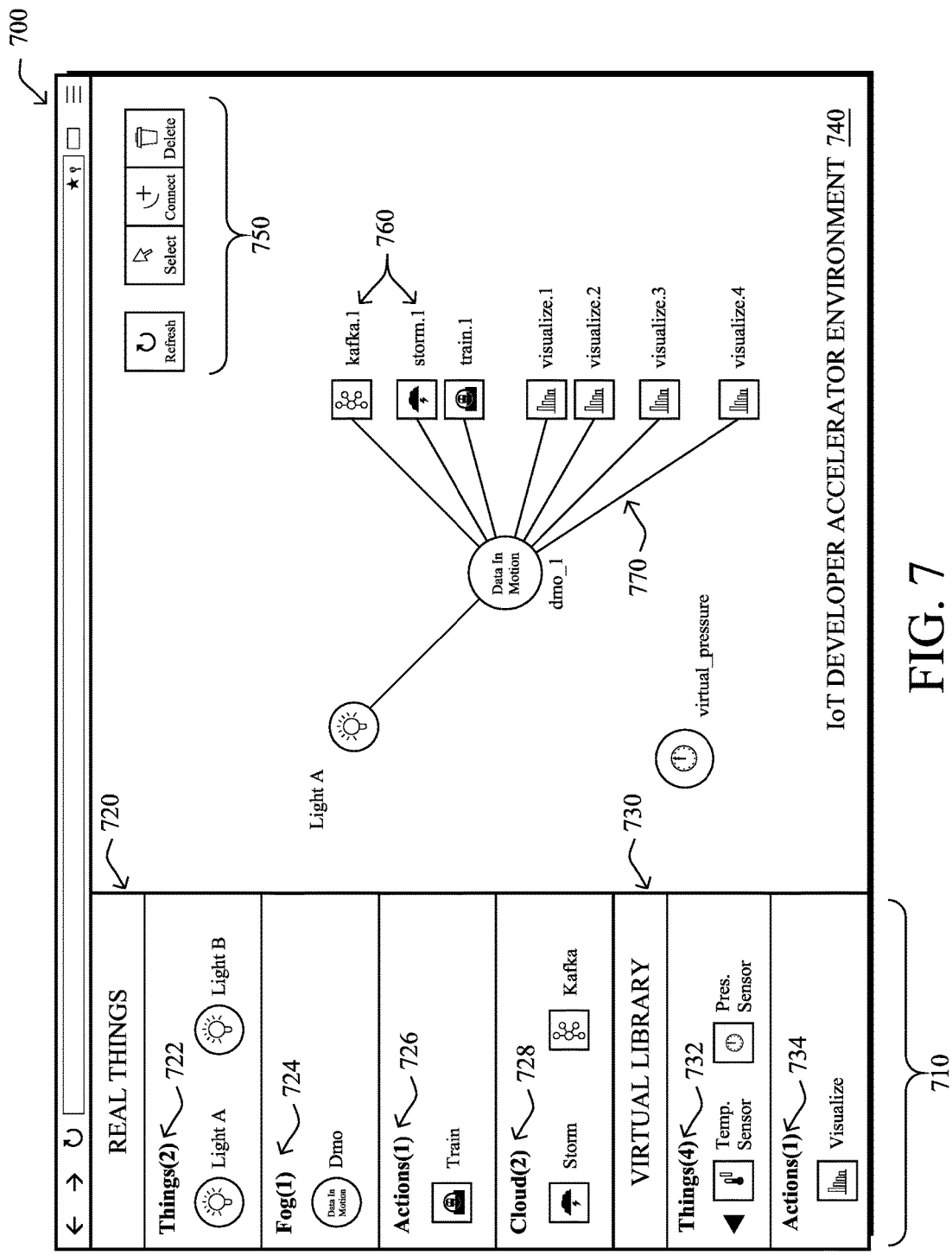
FIG. 7 illustrates an example graphical user interface (GUI) of an IoT IDE.

In addition, FIG. 7 illustrates an example graphical user interface (GUI) 700 for the illustrative IoT IDE. As an example, a menu 710 of "things" may comprise any number of real (physical) things 720, ranging from "things" 722 (e.g., IoT things, such as sensors, actuators, etc.), "fog" 724 (e.g., fog processing devices/logic), "actions" 726 (as mentioned above), and "cloud" 728 (e.g., cloud-based processes). Notably, the real things are actual devices connected to or otherwise accessible by the developer's programming system, such as devices connected through an I/O interface or else on the network in an accessible manner (e.g., the same network, on a public network, etc.). In addition, a library 730 of virtual things may comprise any number of virtual things 732, actions 734, etc., which are not actual devices, and are instead a selection of software-based virtualizations of real things. (As an example differentiation, a light as a real thing may be a physical light on the developer's desk, while a light as a virtual thing may simply be a software representation of a light turning on and off.)

The things, generally, can be placed and interconnected within the IoT Developer Accelerator Environment 740, which allows (menu 750) selecting, connecting, and deleting the objects (nodes 760) and their connections (770), and so on. As shown below, the interconnections and functionality/logic of the things may be programmed and simulated, all based on any combination of real (physical) and virtual inputs, real and virtual processing, and real and virtual outputs.

Figure 8:
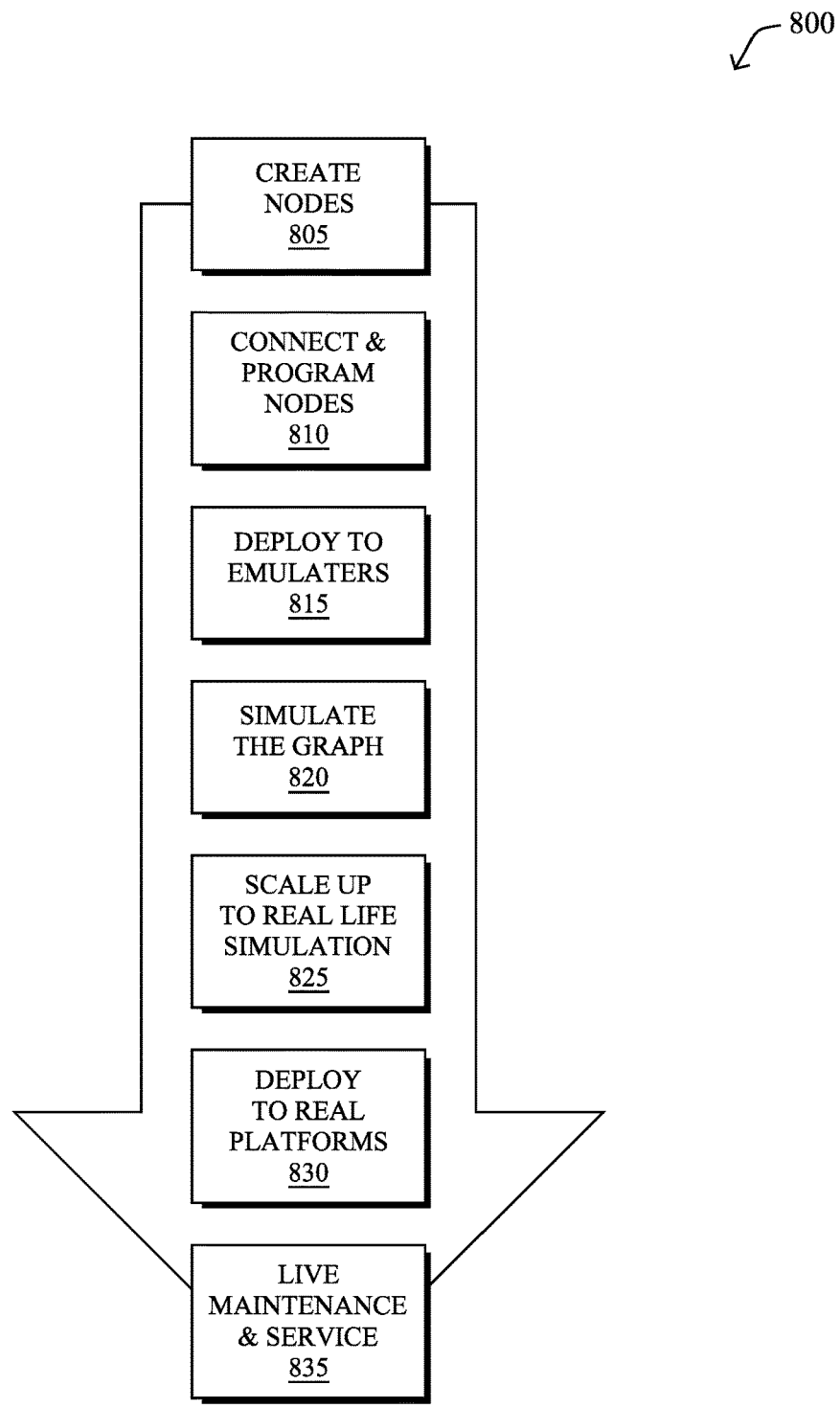
FIG. 8 illustrates an example workflow for an IoT IDE.

An example workflow for the described IDE for developing and evaluating an IoT application/system may include the steps shown in the flow 800 of FIG. 8. As described in greater detail below, such steps may include: creating nodes (805), connecting and programming nodes (810), deploying to emulators (815) and simulating the graph (820), scaling up to real life simulation (825), deploying to real platforms (830), and then live maintenance and service (835).

Figure 9:
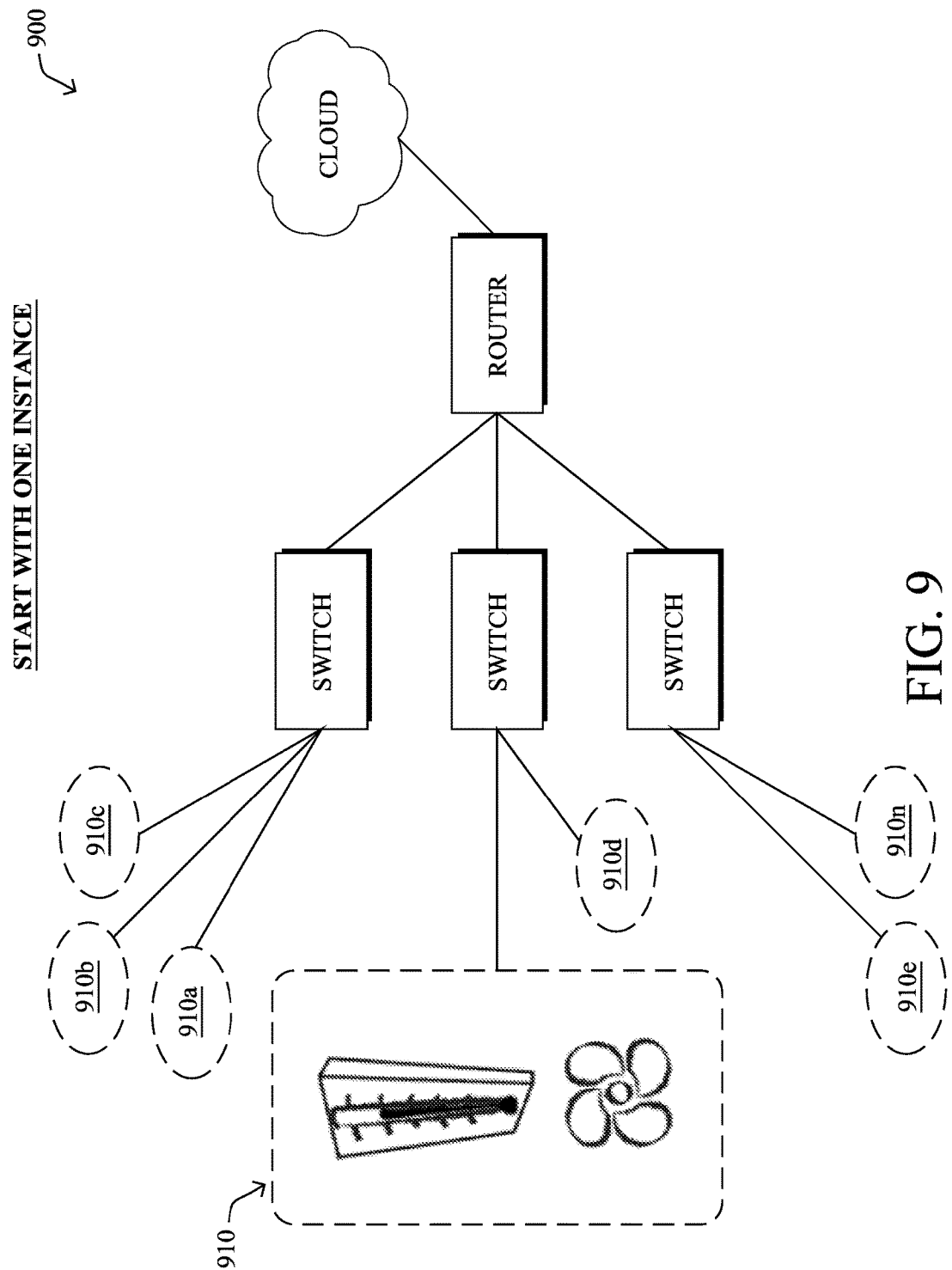
FIG. 9 illustrates an example block diagram with a single instance of a system.

To create nodes in the IDE, developers can either access virtual nodes from a node-kit which contains a pre-defined set of nodes and corresponding functionality, or they can also create new virtual nodes that define the numbers of input and output ports and functionality. Note that in some cases, developers might have a physical development board (e.g. Raspberry Pi) and physical sensors, or else may otherwise have access to other physical things. For example, as shown in FIG. 9, once the developer makes sure one instance 910 of the solution is working properly, they can switch to the IDE platform 900 for scale-up of the entire solution (instances 910*a-n*).

Figure 10:
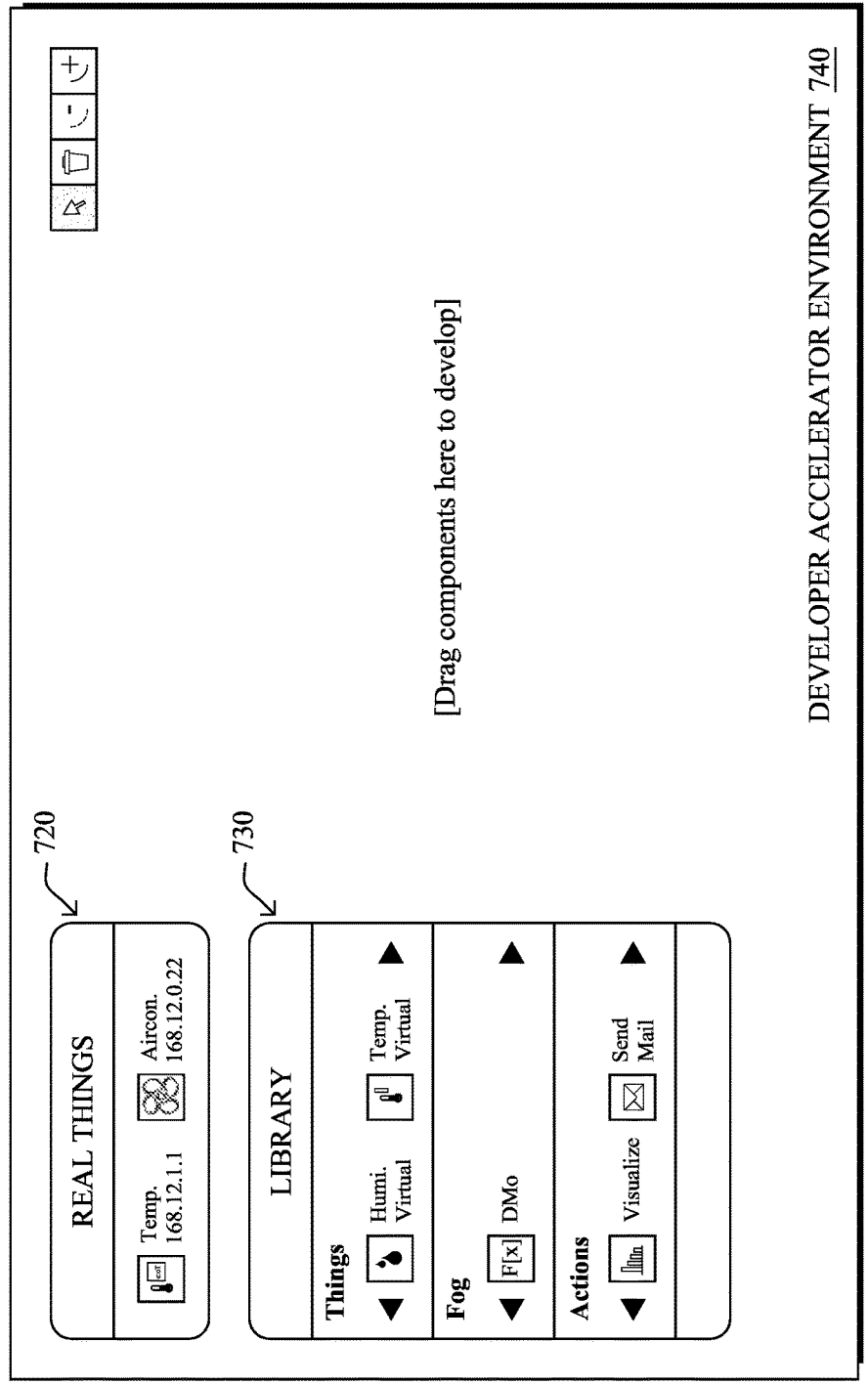
FIG. 10 illustrates an example auto-discovery of real things for an IoT IDE.

Additionally, there are environments in which various real devices may be otherwise accessible to the developer, such as over a computer network. In either case, the IDE platform also supports auto discovering the connected physical devices and auto creating the instances of these devices (as shown in the example 1000 of FIG. 10, populating the real things selection menu 720). In this manner, developers may have a streamlined experience for the hybrid workflow—starting with physical development board and sensors and switching to the virtual environment later on.

Note that the IDE allows developers to use nodes for any of the things/fogs/clouds layers, where these layers have different node implementations because of different runtime environments. For example, for the thing layer, the "Node.js" runtime environment may be used, which is lightweight and can be run in real low-cost hardware such as Raspberry Pi, while the nodes in the Fog layer may be run in the IOx runtime (available from Cisco Systems, Inc.), which would be simulated in the proposed environment. So even the nodes with the same functionality (e.g., MQTT client) but in different layers may be presented as different types of nodes.

Figure 11:
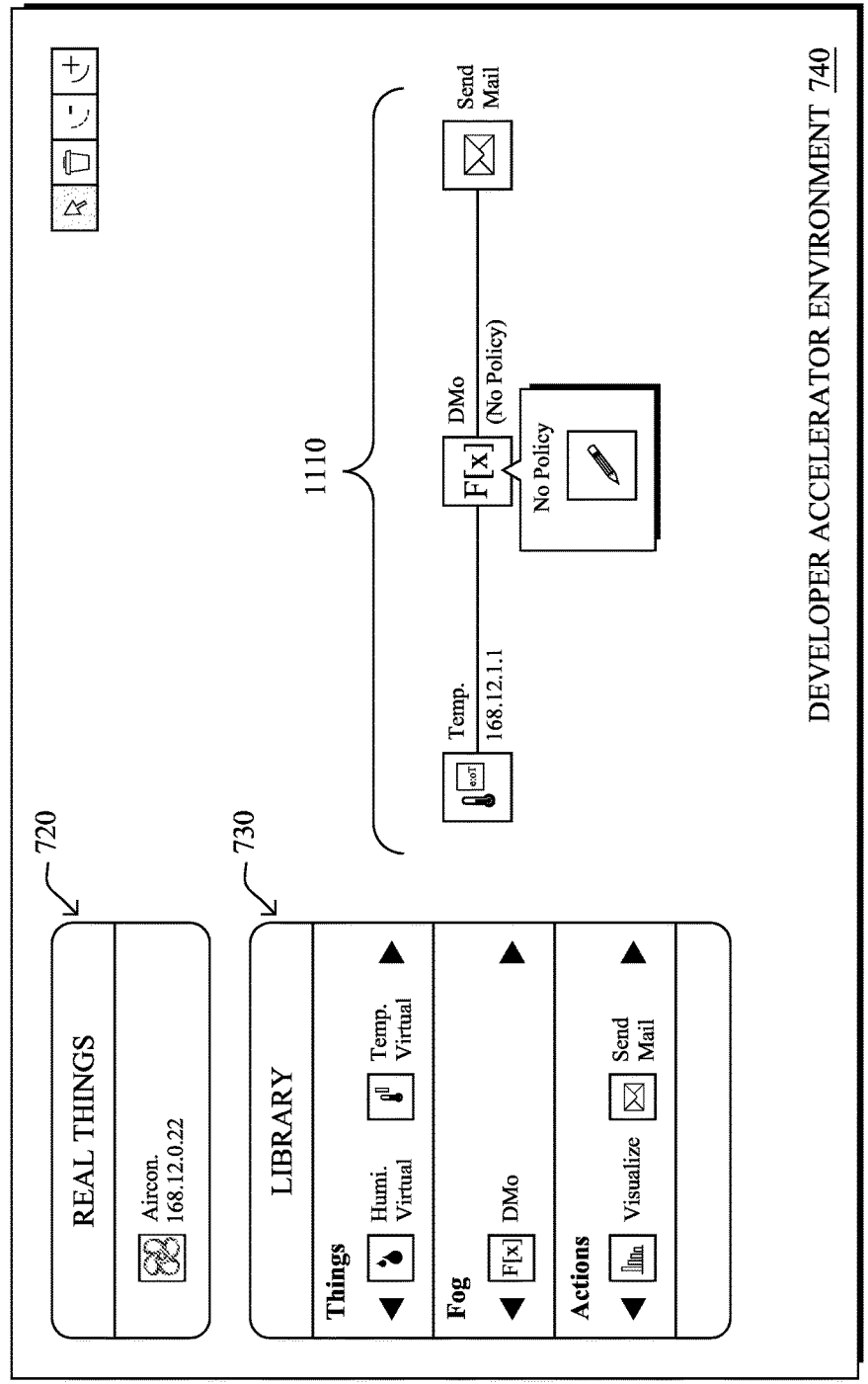
FIG. 11 illustrates an example canvas layout for an IoT IDE.

For connecting and programming nodes, as shown in view 1100 of FIG. 11, the IoT IDE allows developers to visually connect the ports between nodes and then compose them as an interconnected graph on the development "canvas" (1110, generally). Note that for standard networking protocols connecting nodes, e.g., MQTT, the IDE can automatically check for compliance between interconnected nodes and may auto-configure the parameters (e.g., configuring the broker IP address and port number in the MQTT client node).

In one embodiment, particularly for touchscreen implementations, algorithms are defined for auto-placement and auto-connection of the logical "blocks" (nodes). That is, the developer may be able to just select a node, and "flick" it in the general direction of the intended location, and the IoT IDE can determine where to connect the node within the graph based on various rules, e.g., based on input/output ports, how close they are on the canvas, etc. Similar functionality is available for auto-connection of the nodes based on proximity, that is, without the "flicking" motion. In other words, if two nodes are placed near each other that have appropriate "interconnectability" (e.g., a sensor and a sensor gateway), then the IoT IDE may automatically connect those two nodes. (Manual adjustment of the connections and locations are available to the developer in case such auto-placement and auto-connections are not actually the developer's intention.)

Figure 12:
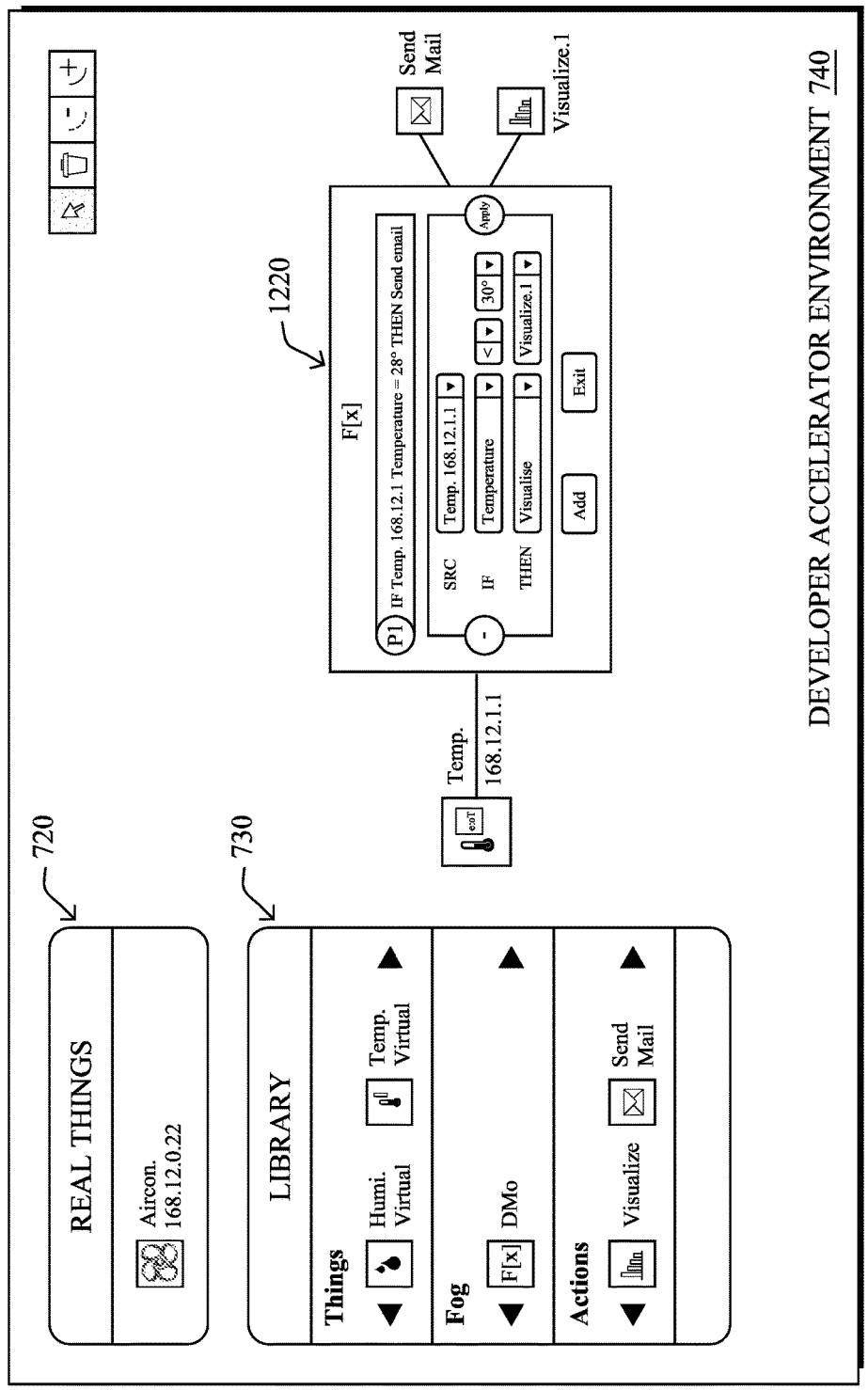
FIG. 12 illustrates an example policy editor for an IoT IDE.

As shown in the view 1200 of the GUI in FIG. 12, the IoT IDE also allows developers to easily provide functionality, write policies, and compile the nodes. (As mentioned above, language editing and building environments for things/fogs/clouds should be different due to different runtimes.) In general, by selecting a given node, such as a fog function node ("F[x]"), based on the inputs and outputs to/from the function node, the IoT IDE can populate various drop-down menus or other selections within a simplified logic programming window 1220 (FIG. 12) for programming by the developer.

More complex functionality may be programmed into the virtual nodes, and the view shown herein is merely for illustration. For instance, different people can work on different modules, such as highly-complex control systems, and then all of these different modules/nodes can be placed in the IoT IDE (e.g., an open API platform) and implemented in a single environment. In this manner, third-party developers are also allowed to write new components for addition to the thing libraries.

Note again the the IoT IDE functions across IoT layers. Certain developers may actually only be interested in programming the sensors, while others may be interested in only the routers and/or fog layers, etc. Since it can be tremendously complicated to program an environment that spans across all the layers (from cloud down to devices), the IoT IDE can abstract certain layers that the developer is not interested in detailing, but that are needed for certain functionality. For instance, assuming that a developer is creating a fog function, he/she may not care about the actual protocol of the sensors, but instead merely requires input that mimics the sensors. Conversely, a developer may be creating a sensor/actuator device, and wants to test the functionality between sending data, and receiving instructions, but may not specifically require the detailed cloud/big data algorithms that determine how or when to provide such instructions based on whatever data.

Once the connections and logic/policies are defined, then the system from the GUI canvas can be deployed to emulators for simulation of the graph. That is, after the graph is formed, the IDE enables developers to deploy the nodes individually to emulation engines. For example, the thing node written above by JavaScript can be deployed to the node.js engine; the fog node could be deployed to the emulated IOx platform. Any appropriate animations can then be displayed to show the data flow and policy, and any visualizations (e.g., graphs, charts, messages, etc.), virtualized acts (e.g., lights turning on/off, actuators moving/activating, etc.) may also be presented within the IoT IDE.

Note that once a smaller graph is verified, such as a single logical grouping (e.g., a sensor, a controller, and an actuator), or a relatively small plurality of groupings (e.g., a plurality of sensors, a controller, and one or more actuators), the IoT IDE may be used to "scale-up" (or "scale-out") this smaller graph into a larger graph, which could be multiple instances of the same graph, or larger numbers of sensors, actuators, etc.

The tested and verified system (app, devices, logic controllers, etc.) may then be deployed to real platforms, i.e., after simulation (particularly on the scale-up scenario), the tested graph/system is ready to deploy to the real platforms (e.g., sending the reference design to manufacturers, etc.).

Figure 13:
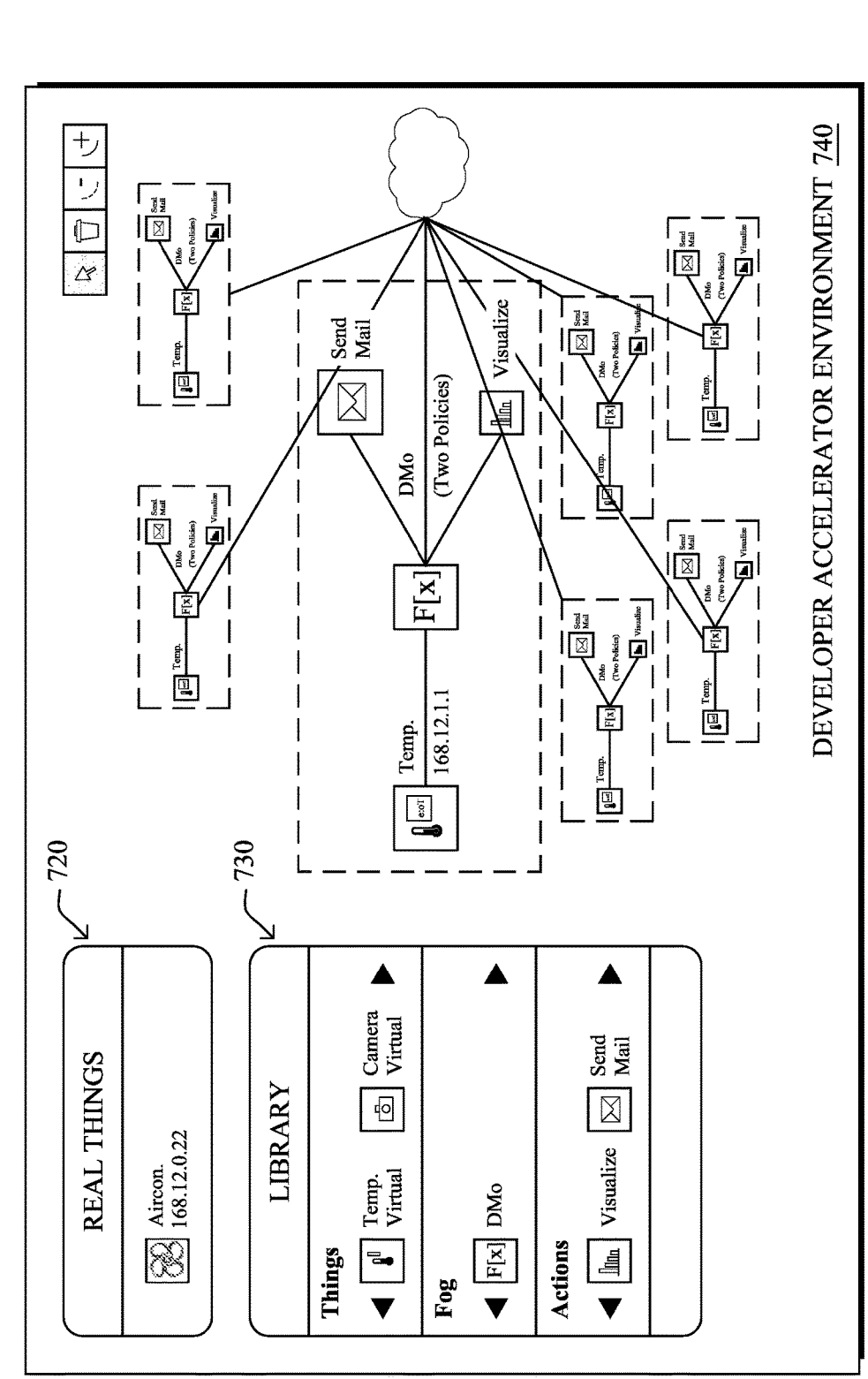
FIG. 13 illustrates an example live management of a system using an IoT IDE.

Once deployed in the real world, the IoT IDE may continue to be used for live maintenance and service, such as the illustrative view 1300 shown in FIG. 13. That is, after the solution is deployed to the real world, the IDE platform can keep monitoring the connected devices and the dataflow, hence acting as a live maintenance and service tool for the solution, where data can be monitored, sensors/actuators can be programmed, logic can be changed, etc. In other words, the IoT IDE can be used for developing an app (setting up logic with devices), and also for operating the system once deployed (working on real things, making things happen, etc.).

The proposed developer environment thus significantly improves the experience of IoT application developers, especially for ones with the Fog computing model. In particular, the IoT IDE herein allows for a workflow that can start with any number of real devices and any number of virtual devices, moving through development, testing, and redesign, through to actual deployment and maintenance with physical devices in the real world.

Figure 14:
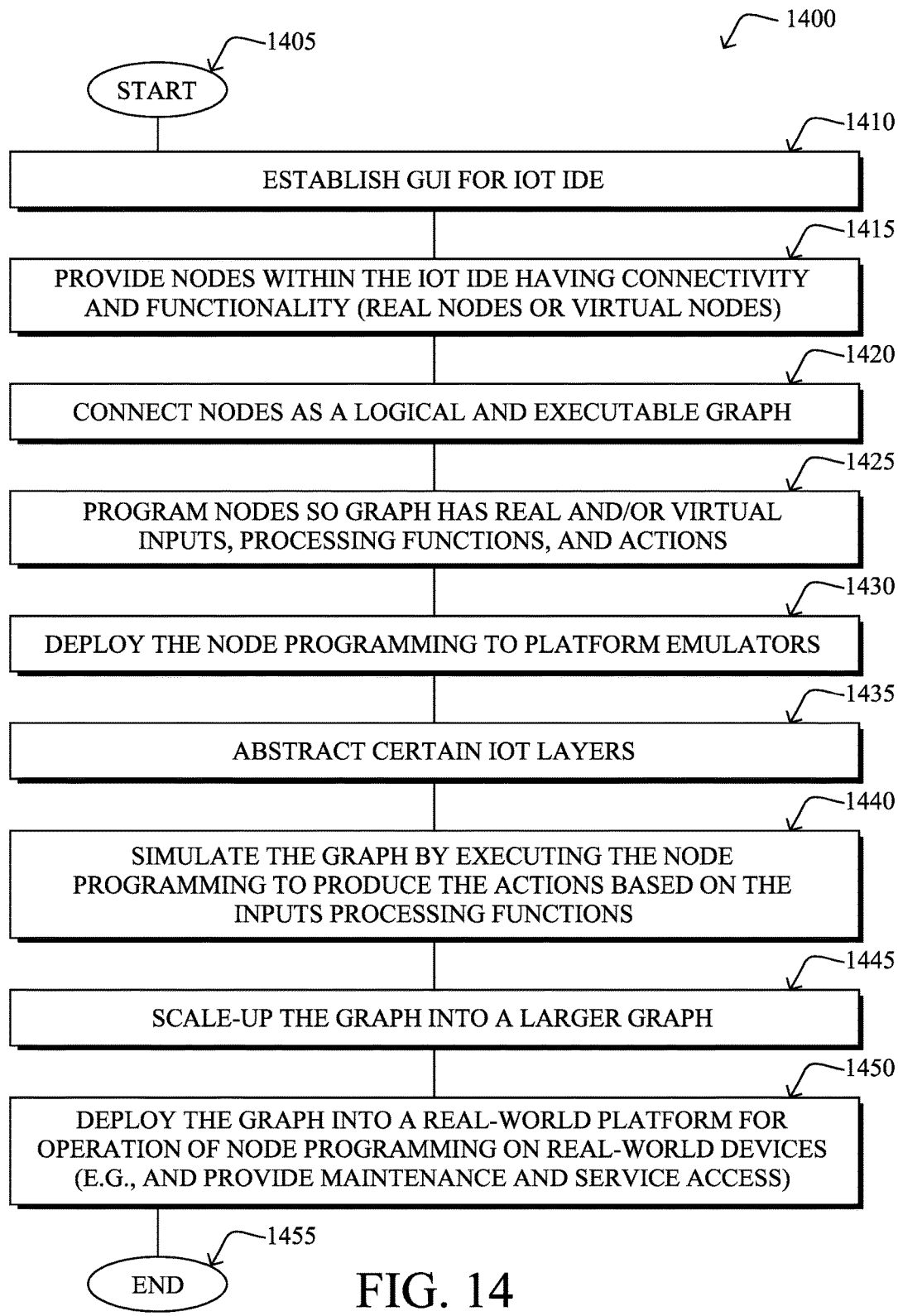
FIG. 14 illustrates an example simplified procedure for executing an IoT IDE in accordance with one or more embodiments described herein.

FIG. 14 illustrates an example simplified procedure for executing an IoT IDE in accordance with one or more embodiments described herein. The procedure 1400 may start at step 1405, and continues to step 1410, where, as described in greater detail above, a graphical user interface (GUI) is established for an Internet of Things (IoT) integrated developer environment (IDE) with one or more visual developer tools. In step 1415, the IoT IDE provides nodes within the IoT IDE having connectivity and functionality, where the nodes selected from a) discovered real nodes in communication with the IoT IDE or b) virtual nodes within the IoT IDE (e.g., virtual nodes in a library of the IoT IDE and/or virtual nodes defined by a developer operating the IoT IDE). Note that the GUI may provide visual programming options based on the connectivity and functionality of the nodes, as mentioned above. Also, as mentioned above, the GUI may be populated with generically connectable and functional nodes, such as sensors, actuators, actors, cloud-based processors, etc.

When connecting a plurality of the nodes in step 1420, as detailed above, the IoT IDE generates a logical and executable graph for a flow-based programming framework virtualized across one or more IoT layers. Notably, in one embodiment, the IoT IDE may check for input/output (I/O) compliance between any two of the nodes prior to allowing a logical connection between those two nodes. As also mentioned above, the IoT IDE may be configured to intelligently auto-place and auto-connect two or more nodes within the IoT IDE based on proximity of the two or more nodes to each other and based on their respective connectivity, as well as other factors that may dictate such intelligent auto-placements and auto-connections. (Manual adjustments may still be made by the user in such an embodiment.)

The nodes represented by the IoT IDE may then be programmed in step 1425 as detailed above, generally based on respective connectivity and functionality, such that the logical and executable graph has one or more real and/or virtual inputs, one or more real and/or virtual processing functions, and one or more real and/or virtual actions (e.g., outputs, visualizations, actuations, notifications, cloud-connected processing, etc.).

In step 1430, the IoT IDE deploys the node programming to one or more corresponding platform emulators configured to execute the node programming (e.g., thing emulators, fog emulators, cloud emulators, and end-user emulators). Note that as explained above, in step 1435 one or more of the IoT layers that are undeveloped by a developer may be abstracted in order to emulate functionality, thus producing an outcome necessary for remaining developed IoT layers (e.g., sensed values, actions, communication protocol operations, and so on).

When the logical and executable graph is simulated in step 1440 by executing the node programming by the IoT IDE, one or more actions are produced based on the one or more inputs and the one or more processing functions from the steps above. In general, the platform emulators cooperate to simulate the corresponding layers of the IoT application designed within the IDE, and may be configured to emulate protocol-level connectivity (e.g., specific message formats, sizes, data, etc.), and/or mere logical connectivity between nodes (e.g., temperature "T" is sent from device "A" to device "B", regardless of protocol used).

In certain embodiments, the IoT IDE may be used to scale-up the graph into a larger graph as described above (e.g., scaling-up the number of nodes, the number of subgraphs, etc.) in step 1445. In addition, in certain embodiments, in step 1450 the resultant graph may be deployed into a real-world platform for operation of node programming on one or more real-world devices (such as for providing maintenance and service access to the deployed graph in a real-time, real-world environment, e.g., a DevOps platform).

The procedure 1400 ends in step 1455, though notably may continue to operate from any step noted above, such as when new nodes are discovered or designed, where new connections are made, new programming configured, and so on.

It should be noted that while certain steps within procedure 1400 may be optional as described above, the steps shown in FIG. 14 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

Physical Space Map Overlay and Interaction for an Internet of Things (IoT) Integrated Developer Environment (IDE)

Notably, the IoT is heavily based on physical locations of devices, such as sensors, cameras, sensed objects, etc. When developing an IoT app, it would be helpful to have this level of detail when creating a virtualized environment based on a physical space. In addition to the four listed pain points and challenges in developing and deploying IoT applications, other challenges include:

A fifth example challenge in deploying and operating the IoT application into a small-scale model physical environment and a large-scale actual physical environment. The sensors and actuators need to be mapped between a logical view and a physical view for real-world operation.

A sixth example challenge lies in representing not only fixed and stationary sensors and actuators, but also mobile sensors and actuators. These moving elements may be carried by robots, unmanned aerial vehicles (UAVs) or drones, or mobile devices carried by people or machines.

According to the embodiments herein, therefore, the IoT IDE provides both a logical view as shown and described above, as well as a physical view or "map view" of the IoT application, allowing adjustments and improvements to be made during operation based on physical location (a virtual physical location or a real-world physical location).

Figure 15:
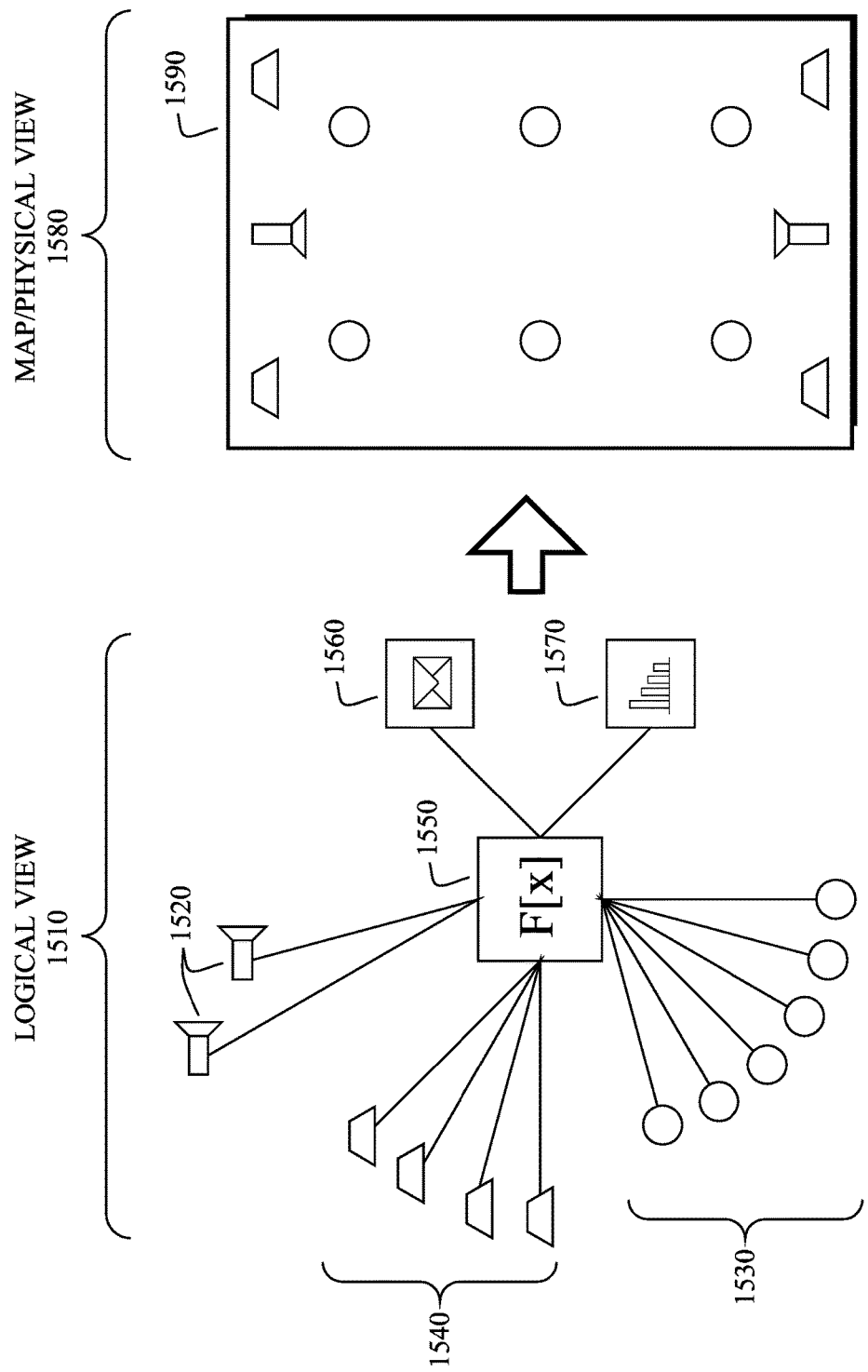
FIG. 15 illustrates an example of a logical view and corresponding map view within an IoT IDE.
Figure 16:
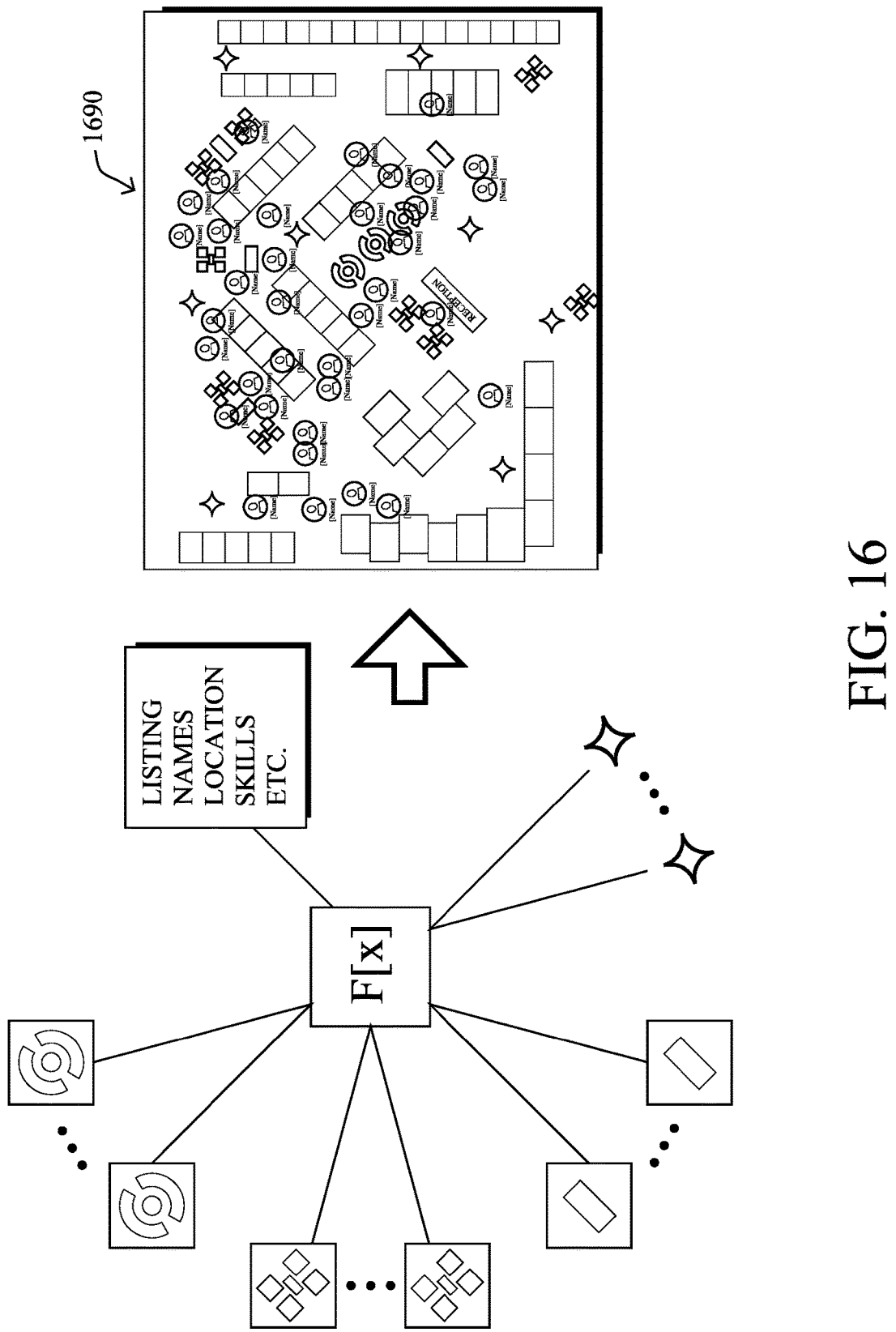
FIG. 16 illustrates another example of a logical view and corresponding map view within an IoT IDE.
Figure 17:
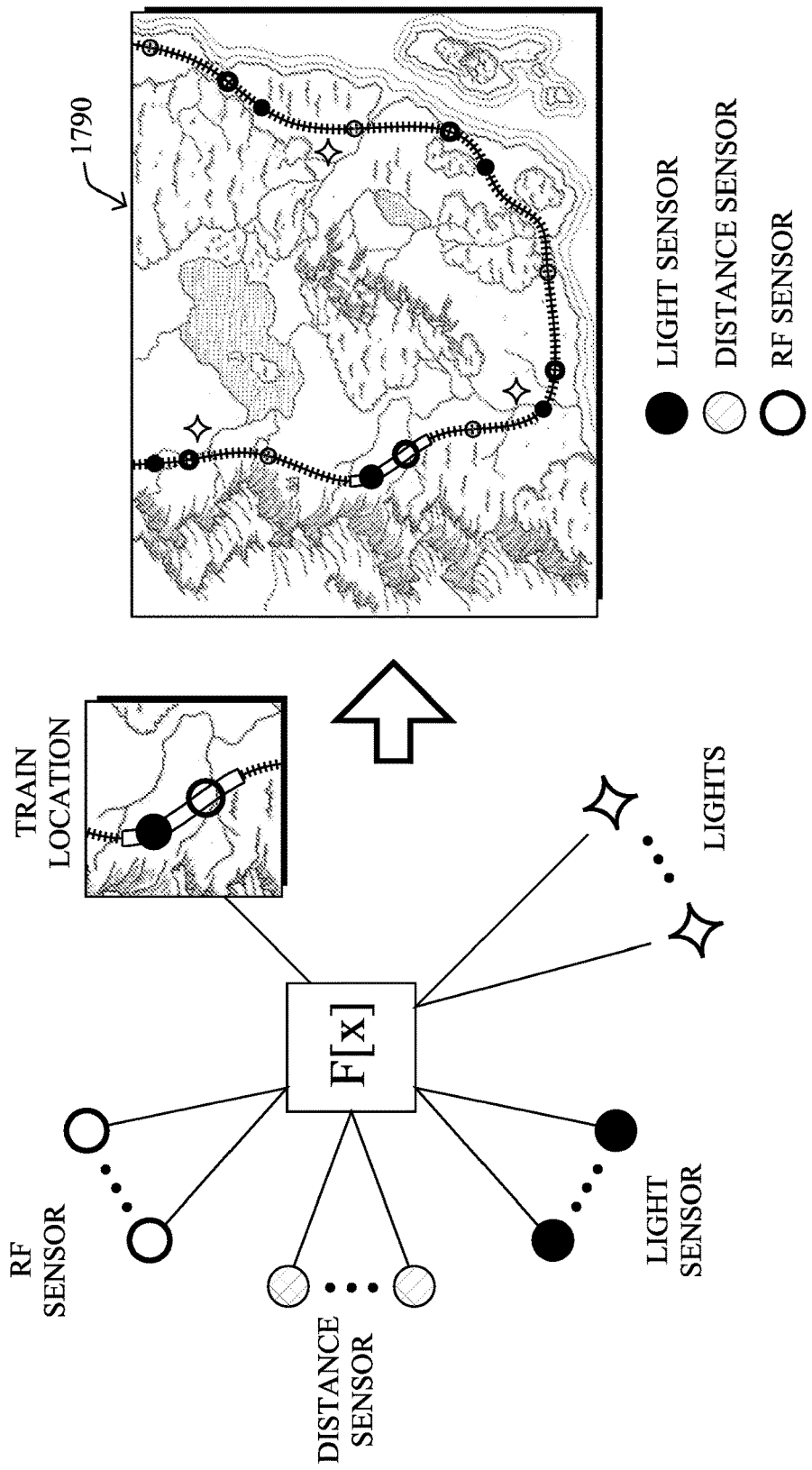
FIG. 17 illustrates another example of a logical view and corresponding map view within an IoT IDE.

Specifically, according to one or more embodiments described in greater detail below, a computer operates an Internet of Things (IoT) integrated developer environment (IDE) having a representation of an IoT application, where the IoT IDE determines whether to display on a graphical user interface (GUI) a logical view, map view, or both, where the logical view illustrates logical connectivity between nodes of the IoT application, and wherein the map view illustrates a locational relationship of the nodes of the IoT application within a represented physical space. The IoT IDE determines which select nodes of the logical view to display in the map view, where each node in the map view must be in the logical view, and displays, on the GUI, the logical view, map view, or both, with all nodes shown in the logical view and select nodes shown in the map view. Additionally, the IoT IDE propagates any changes received by the IoT IDE in one view into the other view when the change would affect the other view Examples of logical views and corresponding map views are shown in FIG. 15, FIG. 16, and FIG. 17. In particular, in FIG. 15, an example logical view 1510 of a number of cameras 1520, temperature sensors 1530, and wireless access points 1540 may be logically connected through a fog controller 1550 to result in various notification (e.g., email 1560) or visualization (e.g., graphs/charts 1570), as desired. The corresponding map view 1580, on the other hand, actually shows the locations of those things within a configured room 1590. In FIG. 16, the details of a space 1690 may be greater than that of FIG. 15, where actual office spaces or furniture is defined and located, and where a listing of user IDs and locations in the logical view can be actually translated to visually representing those users on the map view. Further, in FIG. 17, any given representation of a real world location 1790 can be provided within the map view, e.g., actual imagery or other representative graphics, such as for the illustrative train sensors along a track near a coastal region. (Any logical and/or map view may be created according to the techniques herein, and those shown are merely for example.)

Maps of the locations to be shown in the map view can be manually created (e.g., simple spaces) or else can be loaded for where need to be deployed. Placement of devices/objects can be made within a map, i.e., a physical space representation of a room, city, floor, etc., in a variety of manners. First, actual locations can be mapped from real-world scenarios, based on either location information (e.g., GPS, WiFi location services, etc.), or manually located (e.g., "there's an access point in each corner, about here . . . "). For map views that represent virtual locations (e.g., things that don't yet physically exist in a space), manual placement may again be made, or else an auto-placement algorithm (rules engine) can place things within the space (e.g., one sensor every 10 feet, cameras in locations that provide full video coverage of the space, and so on). Note that one aspect of the embodiments herein is that the placement of the things on the physical map may be incorrect (e.g., when compared to the real world implementation), and as such, the techniques herein allow for the placement to be improved and refined as more information is collected (e.g., manually or automatically).

In this manner, things and other devices may be placed in the logical view with logical connectivity, and in the map view with locational relationship, whether such things or devices are real or virtual. For example, by determining the location of temperature sensors, light sensors, lights, alarms, cameras, wireless access points, objects, and so on, greater simulation and virtualization may be performed than merely a logical view. For example, one simple function that may be defined could be turning on a camera when a certain person moves into a certain area, based on motion sensors, wireless access point access, RFID badging, etc.

According to the embodiments herein, there is interactivity between the logical and mapped views (and thus between the real-world/deployed implementation), such that if any changes are made in one view (e.g., adding a sensor to a room corner in the map view), that same sensor is added to the overall model, and thus translated through to the logical view. Likewise, an addition to the logical view would result in the same addition to the map view, either in a default location, or an auto-placed location based on various parameters, estimates, location information, etc. (which can be manually adjusted by the developer, accordingly). Moreover, in accordance with the techniques herein, when discovery of real devices is available as described above, additional real devices that are discovered can be placed within both the logical view and the map view.

Notably, in accordance with one or more embodiments herein, the developer can continue programming within the map view, defining connections and actions, and refining the location of things within a space for optimal functionality. For example, a virtual sensor can be added to a given location, and the model can be simulated to determine corresponding results (e.g., actions). The location of the virtual sensor can be adjusted to achieve a desired result, and then a corresponding physical (real) sensor can be placed in that location based on the simulated results.

Furthermore, it is possible to take the specified IoT app, described by a logical view and a physical map view of one physical space, and then apply it to a different physical space. For example, an IoT app made for a floor of a company building may be rolled out to all floors of all the company's buildings in the local region, and also, perhaps later, applied to all floors of all buildings in all US sites. In this case the IoT app defined for one space may adjust to be applied to the new layouts of the different floors of the different buildings. This may be done automatically with algorithms that attempt to best auto-place the IoT app in the new space map layouts, or conversely it may be done by taking a first attempt of dong the layout and then asking a user for input to help finalize the layout into the new space.

The techniques described herein, therefore, provide for a physical space map overlay and interaction for an Internet of Things (IoT) integrated developer environment (IDE). While there have been shown and described illustrative embodiments that provide for specific examples of a physical space map overlay and interaction for an Internet of Things (IoT) integrated developer environment (IDE), it is to be understood that various other adaptations and modifications may be made within the spirit and scope of the embodiments herein. In addition, while certain protocols, programming environments, or software languages are shown or described, other suitable protocols may be used, accordingly.

Figure 18:
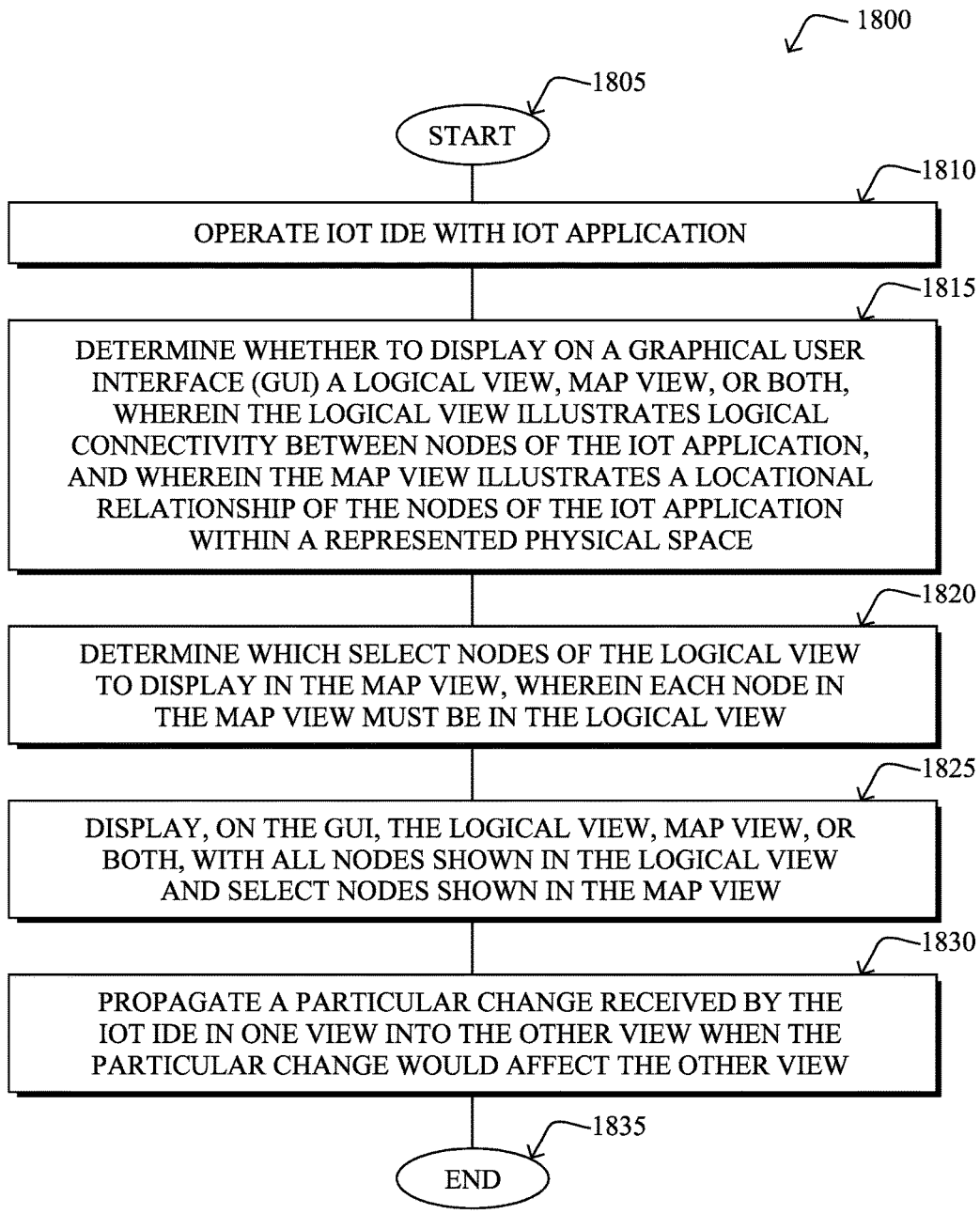
FIG. 18 illustrates an example simplified procedure for a physical space map overlay and interaction for an IoT IDE.

FIG. 18 illustrates an example simplified procedure for a physical space map overlay and interaction for an IoT IDE in accordance with one or more embodiments described herein. The procedure 1800 may start at step 1805, and continues to step 1810, where, as described in greater detail above, an IoT IDE is operated having a representation of an IoT application, where in step 1815, the IoT IDE determines whether to display on a GUI a logical view, map view, or both, based on user selection or other configuration. In particular, as mentioned above, the logical view illustrates logical connectivity between nodes of the IoT application, while the map view illustrates a locational relationship of the nodes of the IoT application within a represented physical space. Notably, the represented physical space may be a virtual representation of a real-world physical space, or else may be an image of a real-world physical space.

As discussed above, the functionality of certain select nodes displayed in the map view may be based on a location of the respective node within the map view, such as based on locational interaction with one or more objects represented within the map view (e.g., features such as presence, obstruction, view, range, line-of-sight, interference, signal strength, distance, separation, relative speed, number of objects in a vicinity, number of nodes in a vicinity, and so on).

In step 1820, the IoT IDE determines which select nodes of the logical view to display in the map view, where each node in the map view must generally be in the logical view (though not necessarily the other way around: e.g., a cloud-based processing device need not have a "location" in a map view). In step 1825, the IoT IDE displays, on the GUI, the logical view, map view, or both, with all nodes shown in the logical view and select nodes shown in the map view. As described above, in step 1830, any changes received by the IoT IDE in one view are propagated into the other view when the particular change would affect the other view.

Notably, as detailed above, nodes may be auto-placed within the map view based on a placement policy. Also, when the represented physical space is a virtual representation of a real-world physical space, the IoT IDE may determine an actual location of a physical node within the real-world physical space (e.g., receiving coordinates from a real-world location-based service capable of determining the actual location of the physical node within the real-world physical space), and may place a virtual representation of the physical node within the represented physical space based on the actual location. Note further that the virtual representation of the physical node may be moved within the represented physical space away from the actual location (e.g., receiving manual placement instructions from a user).

Lastly, it should be noted that the represented physical space may be changed within the map view (e.g., switching from one environment to another, but with the same devices remaining).

The illustrative and simplified procedure 1800 may end in step 1835, though notably with the option to continue from any of the mentioned steps above, e.g., adding or removing devices or objects, switching between logical and map views, and so on.

It should be noted that while certain steps within procedure 1800 may be optional as described above, the steps shown in FIG. 18 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

Autonomous Mobile Sensor Movement Path Simulation with an Integrated Developer Environment (IDE)

When deploying a mobile sensor, such as a drone, UAV, or a robot, there is much testing that needs to be performed to ensure that the mobile sensor knows how to "get around". According to the techniques herein, by using the map view from the IoT IDE as described above, a virtualized physical environment that mixes virtualized things and real-world things can be established through which a virtualized mobile sensor can traverse, testing its logic algorithms before it is placed in the physical world. For example, a physical space can be modelled to include the real-world obstacles, as well as the real world conditions. The mobile sensor can then have its logic functionally operate within the virtualized space of real-world conditions (varying signal strengths, random objects, etc.) to determine whether its logic functions properly. In one embodiment, the techniques herein also allow for testing the changing between logic inputs, such as from WiFi to GPS to visual, etc. In addition to using the IDE to simulate a path, the techniques herein can also be used to design and specify a path or mission that a drone or robot will take. This can be done manually or else automatically where there is an analytics/machine learning service/capability that calculates the path or mission that the drone or robot should take.

Specifically, in one embodiment, a computer operates an Internet of Things (IoT) integrated developer environment (IDE) having a virtualized map view illustrating a locational relationship between objects of an IoT application within a represented physical space, where a mobile sensor is virtually represented within the IoT IDE, the mobile sensor configured with navigation control logic affected by external influences and controlled according to the IoT application. Virtualized external influences may be modelled within the IoT IDE that represent physical external influences within the physical space, and the navigation control logic of the mobile sensor may be operated within the IoT IDE according to the IoT application, the virtually represented mobile sensor configured to navigate within the virtual space based on the navigation control logic reacting to the virtual external influences.

As noted above, a physical space can be modelled to include the real-world obstacles, as well as the real world conditions, such as wireless access points, Bluetooth connectivity, GPS signals, etc. Such a modelling can be simulated or measured in the real space for input to the simulation. The mobile sensor can then have its logic functionally operate within the virtualized space of real-world conditions (varying signal strengths, random objects, etc.) to determine whether its logic functions properly.

In addition to using the IDE to simulate a path, it can also be used to design and specify a path or mission that the drone or robot will take. This can be done manually or automatically. When done automatically, there is an analytics/machine learning service/capability that calculates the path or mission that the drone or robot should take. This service/capability can be performed anywhere in the IoT environment—on the sensor, drone/robot, fog router, or in the cloud.

Figure 19:
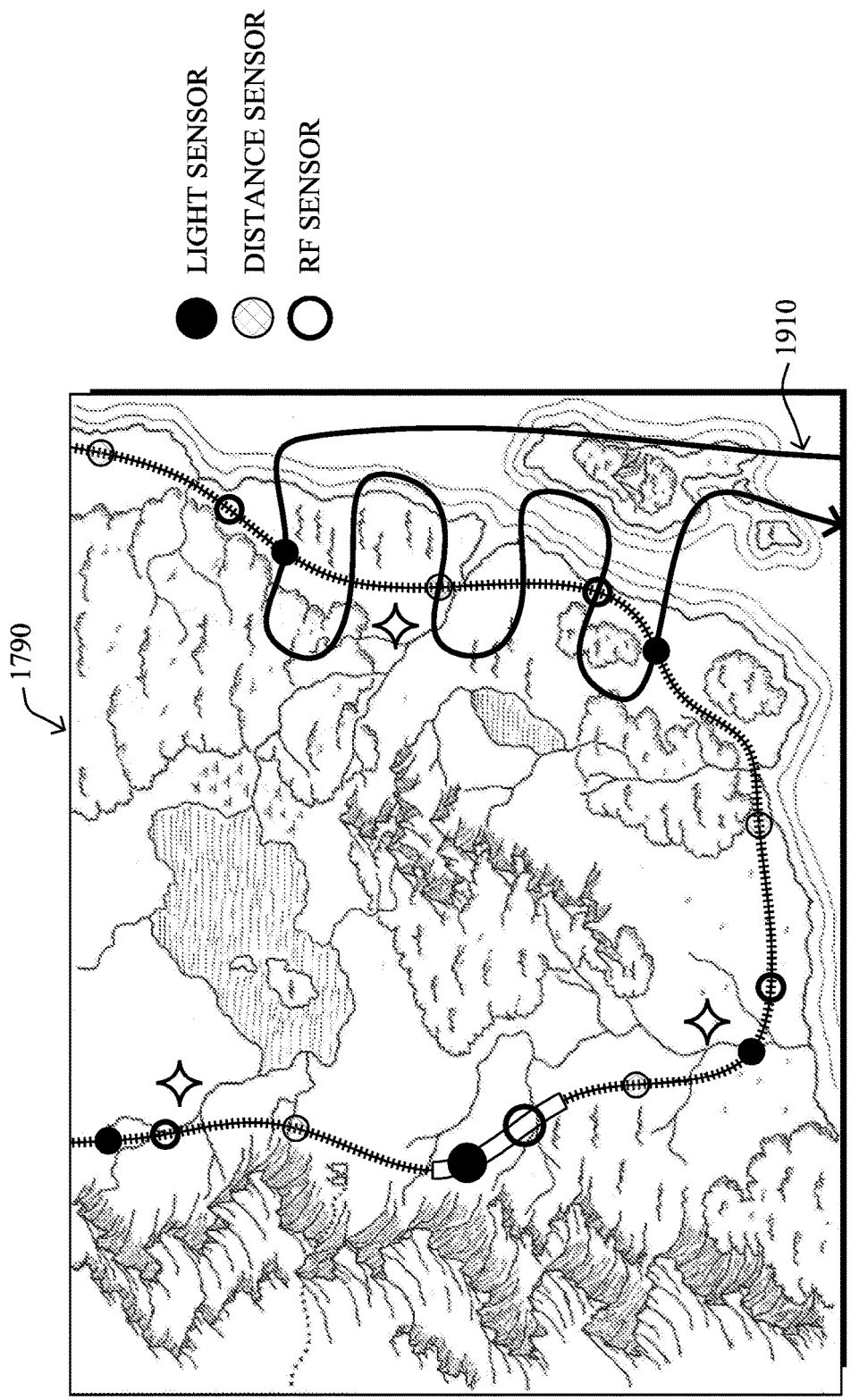
FIG. 19 illustrates an example of a mobile sensor path within a real-world (e.g., map view) environment using an IoT IDE.

FIG. 19 illustrates an example of a mobile sensor path 1910 within a real-world environment (e.g., map view 1790 of FIG. 17), where the dark line 1910 represents the path of an illustrative drone/UAV scanning the area of a fault (the "X") on the train track. As mentioned above, the path can either be an autonomously determined path based on input and decision algorithms, or may be a developer-defined path/mission. Through the combination of logical view's connectivity and logic, and the map view's physical object locations and real-world scenario generation, the logic or path programming of a mobile sensor can be tested in the IoT IDE simulation prior to being deployed in the field. That is, by testing a device using object location and real-world input of a space, the developer can see how a mobile sensor would likely reacts in a real situation before putting it in actual service. For instance, assume that the drone/UAV in FIG. 19 is programmed to response to a detected event (e.g., to collect more information and/or take action), the virtualized simulation can help determine whether the drone/UAV would respond appropriately using its own sensor logic, or using a specifically programmed path. This may be particularly helpful in situations where signal strengths are used to determine which logical input(s) to use for navigation, such as changing between GPS navigation, wifi navigation, visual navigation, and so on.

Another aspect of the embodiments herein is "DevOps for IoT", meaning that since an IoT infrastructure and service is programmable, the IDE is becoming an operations console for the operator. The operator is a "developer" that can program the live environment, perhaps first in simulation but also immediately in the deployed environment. The DevOps console can be used by different parties, for example, a building operator, emergency personnel (e.g., firefighters or paramedics, etc.), and so on. Each operator should thus each be able to access, monitor, and program at different levels based on their needs and access permissions (e.g., requiring an access control and policy, as well.) In the example above, therefore, when an actual incident occurs, the DevOps console could show the status of the sensors, the location of the drone/UAV, the path of the drone/UAV, the location of the train (e.g., and its movement), etc.

Also, it is important to note that the operator can also "develop" in the environment during operation. For example, a firefighter can perhaps add new sensors and actuators while doing an inspection or during an actual fire, where he deploys additional temperature sensors or deploys hoses that can be used or controlled to help put out the fire via the robots/UAVs/drones. Also, the IDE could allow the spread of the fire to be marked and adjusted during the event and during operation, and allow the IoT app to change behavior accordingly. There may be a number of implications for this type of activity as well.

The techniques described herein, therefore, provide for autonomous mobile sensor movement path simulation with an integrated developer environment (IDE). While there have been shown and described illustrative embodiments that provide for specific examples of autonomous mobile sensor movement path simulation with an integrated developer environment (IDE), it is to be understood that various other adaptations and modifications may be made within the spirit and scope of the embodiments herein. In addition, while certain protocols, programming environments, or software languages are shown or described, other suitable protocols may be used, accordingly.

Figure 20:
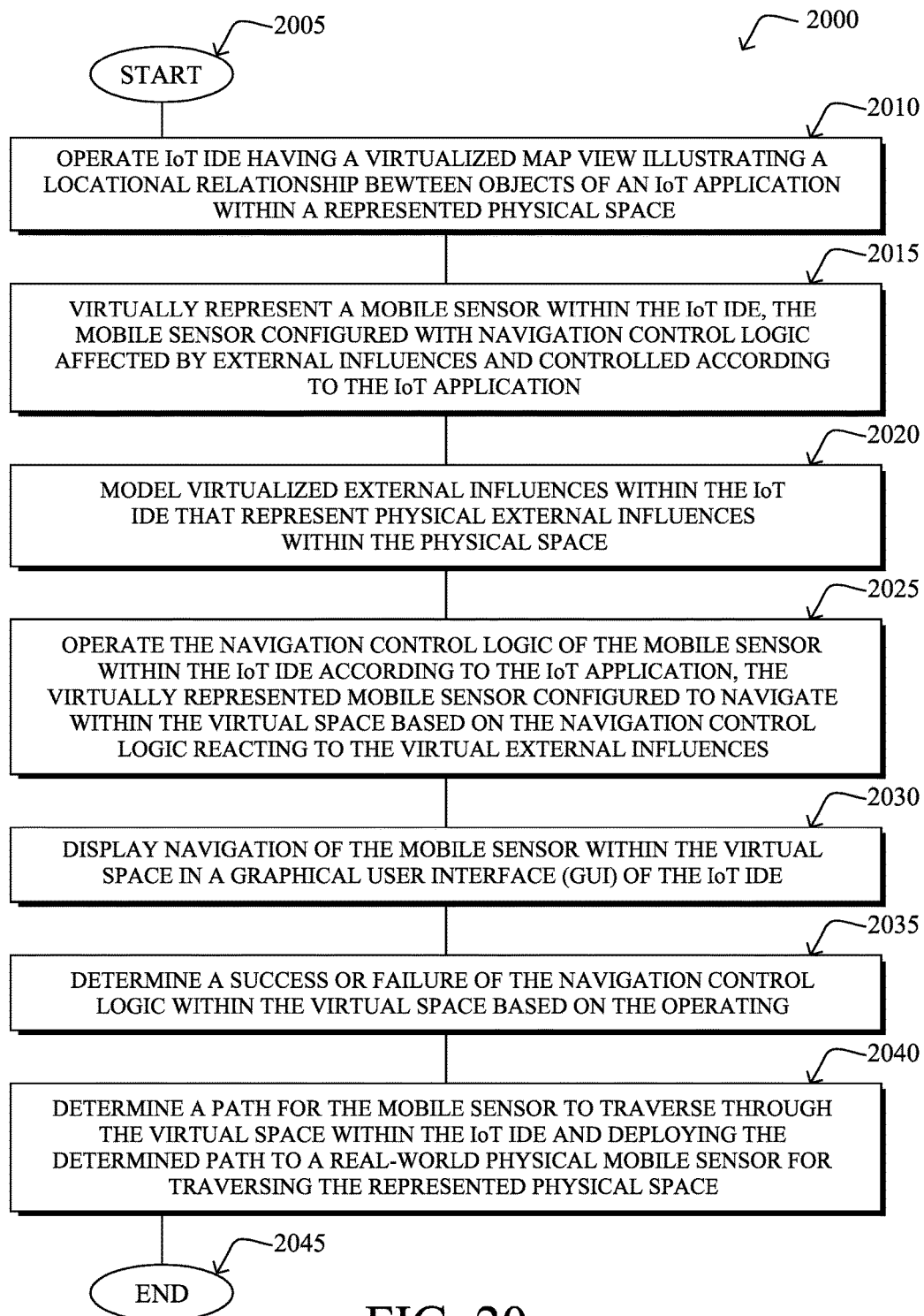
FIG. 20 illustrates an example simplified procedure for autonomous mobile sensor movement path simulation with an IDE.

FIG. 20 illustrates an example simplified procedure for autonomous mobile sensor movement path simulation with an IDE in accordance with one or more embodiments described herein. The procedure 2000 may start at step 2005, and continues to step 2010, where, as described in greater detail above, an IoT IDE operates with a virtualized map view illustrating a locational relationship between objects of an IoT application within a represented physical space (e.g., a virtual representation of a real-world physical space, or otherwise). In step 2015, the IoT IDE also virtually represents a mobile sensor (e.g., robot, drone, UAV, autonomous vehicle, etc.) within the IoT IDE, where the mobile sensor is configured with navigation control logic affected by external influences and controlled according to the IoT application, as described above.

In step 2020, the IoT IDE also models virtualized external influences within the IoT IDE that represent physical external influences within the physical space. For example, as mentioned above, such virtualized external influences may be based on the represented physical space containing virtualized wireless signal strengths that affect the mobile sensor navigation control logic, virtualized physical obstructions around which the mobile sensor must traverse based on the navigation control logic, or other virtualized external influences, accordingly.

In step 2025, the navigation control logic of the mobile sensor is operated/simulated within the IoT IDE according to the IoT application. That is, the virtually represented mobile sensor is configured to navigate within the virtual space based on the navigation control logic reacting to the virtual external influences. Note that step 2025 may actually be controlling a real-world physical mobile sensor using the IoT IDE, and may be autonomous, or may otherwise be receiving directional inputs at the IoT IDE from a user (where the navigation control logic of the mobile sensor reacts to external influences, e.g., avoiding rocks, switching from GPS to wi-fi navigation). Optionally, in step 2030, the IoT IDE may display the navigation of the mobile sensor within the virtual space in a GUI.

In certain embodiments, in step 2035, the techniques herein may also be used to determine a success or failure of the navigation control logic within the virtual space based on the operating, as described above. Additionally, in step 2040, the techniques herein may also determine a path for the mobile sensor to traverse through the virtual space within the IoT IDE and deploy the determined path to a real-world physical mobile sensor for traversing the represented physical space, as also detailed above.

The example simplified procedure 2000 illustratively ends in step 2045, though notably has the option of continuing to control mobile sensors, updating control algorithms/logic for the mobile sensor, updating external influences, and so on.

It should be noted that while certain steps within procedure 2000 may be optional as described above, the steps shown in FIG. 20 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 1400, 1800, and 2000 are described separately, certain steps from each procedure may be incorporated into each other procedure, and the procedures are not meant to be mutually exclusive.

Illustratively, the techniques described herein may be performed by hardware, software, and/or firmware, such as in accordance with various applications, devices, communication modules, etc. For instance, various processes/programs may include computer executable instructions executed by a processor to perform functions relating to the techniques described herein.

Figure 21:
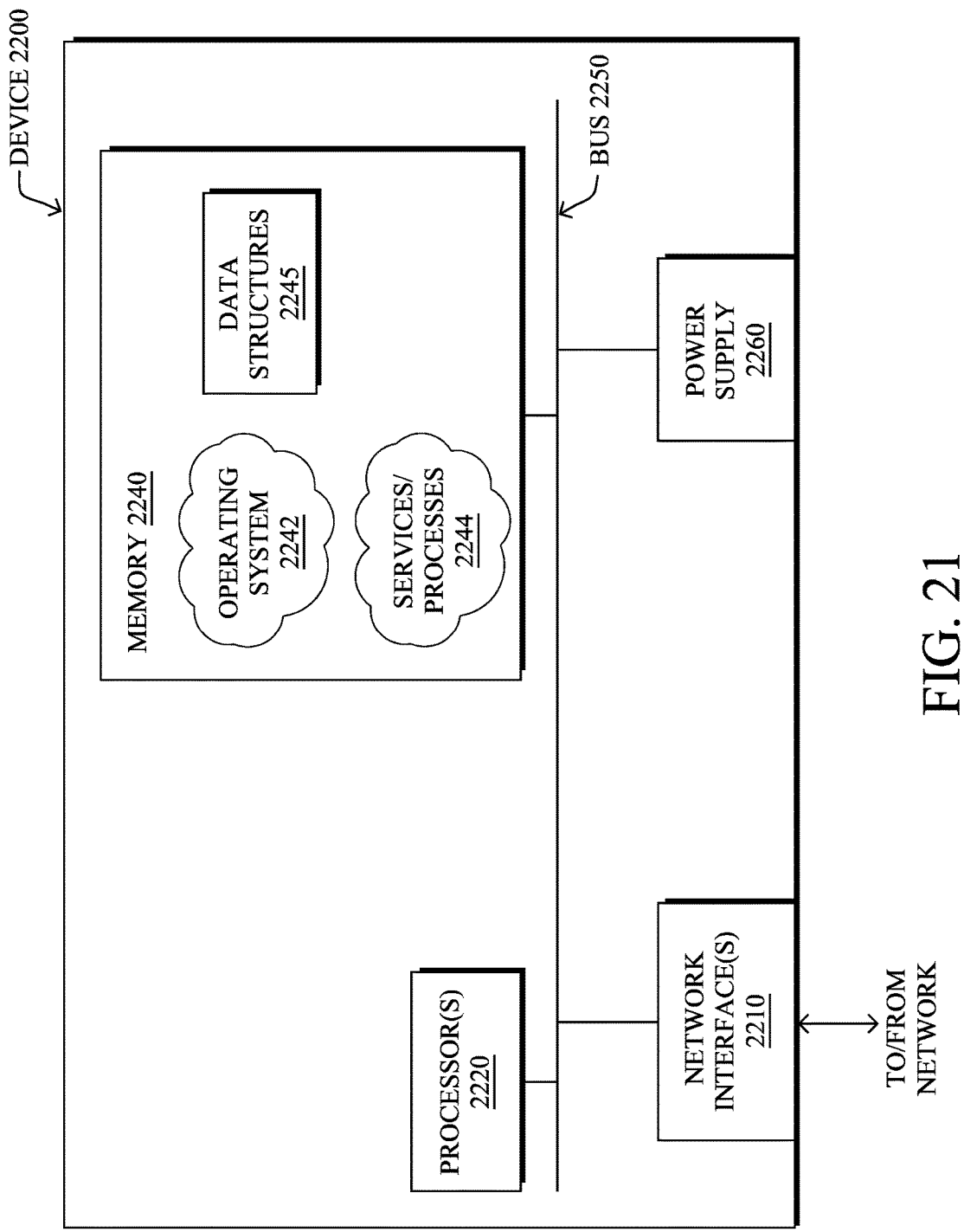
FIG. 21 illustrates an example device/node.

FIG. 21 is a schematic block diagram of an example node/device 2200 that may be used with one or more embodiments described herein, e.g., as any of the computing devices shown, described, or implied above. The device 2200 generally may comprise one or more network interfaces 2210, one or more processors 2220, and a memory 2240 interconnected by a system bus 2250, and is powered by a power supply 2260.

The network interfaces 2210 include the mechanical, electrical, and signaling circuitry for communicating data over physical links coupled to a computer network. The network interfaces may be configured to transmit and/or receive data using a variety of different communication protocols. Notably, a physical network interface may also be used to implement one or more virtual network interfaces, as will be understood by those skilled in the art. The memory 2240 comprises a plurality of storage locations that are addressable by the processor(s) 2220 and the network interfaces 2210 for storing software programs and data structures associated with the embodiments described herein. The processor 2220 may comprise necessary elements or logic adapted to execute the software programs and manipulate the data structures 2245. An operating system 2242, portions of which are typically resident in memory 2240 and executed by the processor(s), functionally organizes the node by, among other things, invoking network operations in support of software processes and/or services 2244 executing on the device. These software processors and/or services may comprise computer executable instructions executed by processor 2220 to perform various functionality as described above, and may interact with other processes/services 2244 within memory 2240 of the device 2200 or with processes/services of other devices.

It will be apparent to those skilled in the art that other processor and memory types, including various computer-readable media, may be used to store and execute program instructions pertaining to the techniques described herein. Also, while the description illustrates various processors, it is expressly contemplated that various processors may be embodied as modules configured to operate in accordance with the techniques herein (e.g., according to the functionality of a similar process). Further, while processors may be shown and/or described separately, those skilled in the art will appreciate that processors may be routines or modules within other processors.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
operating, by a computer, an Internet of Things (IoT) integrated developer environment (IDE) having a virtualized map view illustrating a locational relationship between objects of an IoT application within a represented physical space, wherein IDE produces an executable graph that operates as a flow-based programmable framework virtualized across a plurality of IoT layers;
virtually representing a mobile sensor within the IoT IDE, the mobile sensor configured with navigation control logic affected by external influences and controlled according to the IoT application;
modelling virtualized external influences within the IoT IDE that represent physical external influences within the physical space;
developing, by the IoT IDE, an IoT IDE environment based on the modeled virtualized influences;
operating the navigation control logic of the mobile sensor within the IoT IDE according to the IoT application, the virtually represented mobile sensor configured to navigate within the virtual space based on the navigation control logic reacting to the virtual external influences prior to navigating the mobile sensor in the physical space;
based on how the mobile sensor navigates through the virtual space, determining, by the IoT IDE, a success or failure of the navigation control logic within the virtual space; and
adjusting, by the IoT IDE, the IoT IDE environment based on the success or failure.

2. The method as in claim 1, further comprising:
displaying navigation of the mobile sensor within the virtual space in a graphical user interface (GUI) of the IoT IDE.

3. The method as in claim 1, wherein operating the navigation control logic further comprises:
controlling a real-world physical mobile sensor using the IoT IDE.

4. The method as in claim 3, wherein controlling comprises:
receiving directional inputs at the IoT IDE from a user, wherein the navigation control logic of the mobile sensor reacts to external influences.

5. The method as in claim 1, further comprising:
determining a path for the mobile sensor to traverse through the virtual space within the IoT IDE; and
deploying the determined path to a real-world physical mobile sensor for traversing the represented physical space.

6. The method as in claim 1, wherein the represented physical space contains virtualized wireless signal strengths that affect the mobile sensor navigation control logic.

7. The method as in claim 1, wherein the represented physical space contains virtualized physical obstructions around which the mobile sensor must traverse based on the navigation control logic.

8. The method as in claim 1, wherein the represented physical space is a virtual representation of a real-world physical space.

9. The method as in claim 1, wherein the mobile sensor is selected from a group consisting of: a robot; a drone; an unmanned aerial vehicle (UAV); and an autonomous vehicle.

10. A tangible, non-transitory computer-readable media comprising program instructions, which when executed on a processor are configured to:
   operate an Internet of Things (IoT) integrated developer environment (IDE) having a virtualized map view illustrating a locational relationship between objects of an IoT application within a represented physical space, wherein IDE produces an executable graph that operates as a flow-based programmable framework virtualized across a plurality of IoT layers;
   virtually represent a mobile sensor within the IoT IDE, the mobile sensor configured with navigation control logic affected by external influences and controlled according to the IoT application;
   model virtualized external influences within the IoT IDE that represent physical external influences within the physical space;
   develop an IoT IDE environment based on the modeled virtualized influences;
   operate the navigation control logic of the mobile sensor within the IoT IDE according to the IoT application, the virtually represented mobile sensor configured to navigate within the virtual space based on the navigation control logic reacting to the virtual external influences prior to navigating the mobile sensor in the physical space;
   based on how the mobile sensor navigates through the virtual space, determine a success or failure of the navigation control logic within the virtual space; and
   adjust the IoT IDE environment based on the success or failure.

11. The computer-readable media as in claim 10, wherein the program instructions when executed are further configured to:
   display navigation of the mobile sensor within the virtual space in a graphical user interface (GUI) of the IoT IDE.

12. The computer-readable media as in claim 10, wherein the program instructions when executed to operate the navigation control logic are further configured to:
   control a real-world physical mobile sensor using the IoT IDE.

13. The computer-readable media as in claim 12, wherein the program instructions when executed to control are further configured to:
   receive directional inputs at the IoT IDE from a user, wherein the navigation control logic of the mobile sensor reacts to external influences.

14. The computer-readable media as in claim 10, wherein the program instructions when executed are further configured to:
   determine a path for the mobile sensor to traverse through the virtual space within the IoT IDE; and
   deploy the determined path to a real-world physical mobile sensor for traversing the represented physical space.

15. The computer-readable media as in claim 10, wherein the represented physical space contains one or more of virtualized wireless signal strengths that affect the mobile sensor navigation control logic or virtualized physical obstructions around which the mobile sensor must traverse based on the navigation control logic.

16. The computer-readable media as in claim 10, wherein the mobile sensor is selected from a group consisting of: a robot; a drone; an unmanned aerial vehicle (UAV); and an autonomous vehicle.

17. An apparatus, comprising:
   a processor adapted to execute one or more processes; and
   a memory configured to store a process executable by the processor, the process when executed operable to:
      operate an Internet of Things (IoT) integrated developer environment (IDE) having a virtualized map view illustrating a locational relationship between objects of an IoT application within a represented physical space, wherein IDE produces an executable graph that operates as a flow-based programmable framework virtualized across a plurality of IoT layers;
      virtually represent a mobile sensor within the IoT IDE, the mobile sensor configured with navigation control logic affected by external influences and controlled according to the IoT application;
      model virtualized external influences within the IoT IDE that represent physical external influences within the physical space;
      develop an IoT IDE environment based on the modeled virtualized influences;
      operate the navigation control logic of the mobile sensor within the IoT IDE according to the IoT application, the virtually represented mobile sensor configured to navigate within the virtual space based on the navigation control logic reacting to the virtual external influences prior to navigating the mobile sensor in the physical space;
      based on how the mobile sensor navigates through the virtual space, determine a success or failure of the navigation control logic within the virtual space; and
      adjust the IoT IDE environment based on the success or failure.

18. The apparatus as in claim 17, wherein the process when executed to operate the navigation control logic is further operable to:
   control a real-world physical mobile sensor using the IoT IDE.

* * * * *